(12) United States Patent
Yoshida

(10) Patent No.: US 8,540,906 B2
(45) Date of Patent: Sep. 24, 2013

(54) METHOD OF MOLDING, PROCESS FOR PRODUCING LENS, MOLDING APPARATUS, PROCESS FOR PRODUCING STAMPER, MASTER PRODUCTION APPARATUS, STAMPER PRODUCTION SYSTEM, AND STAMPER PRODUCTION APPARATUS

(75) Inventor: Kunio Yoshida, Kanagawa (JP)

(73) Assignee: AJI Co., ltd., Kanagawa (JP)

( * ) Notice: Subject to any disclaimer, the term of this patent is extended or adjusted under 35 U.S.C. 154(b) by 383 days.

(21) Appl. No.: 12/663,889

(22) PCT Filed: Jun. 12, 2008

(86) PCT No.: PCT/JP2008/060780
§ 371 (c)(1),
(2), (4) Date: Dec. 10, 2009

(87) PCT Pub. No.: WO2008/153102
PCT Pub. Date: Dec. 18, 2008

(65) Prior Publication Data
US 2010/0181691 A1   Jul. 22, 2010

(30) Foreign Application Priority Data

Jun. 14, 2007  (JP) .................................. 2007-157396
May 20, 2008  (JP) .................................. 2008-131564

(51) Int. Cl.
*G02B 1/12* (2006.01)
*B29D 11/00* (2006.01)

(52) U.S. Cl.
USPC ............ 264/1.32; 264/219; 264/2.5; 264/2.7; 264/293; 425/385

(58) Field of Classification Search
USPC ....... 264/1.1, 1.32, 2.5, 219, 328.1, 293–294; 425/385
See application file for complete search history.

(56) References Cited

U.S. PATENT DOCUMENTS 3,830,460 A * 8/1974 Beattie ........................ 249/134
4,121,896 A * 10/1978 Shepherd ..................... 425/412
(Continued)

FOREIGN PATENT DOCUMENTS

EP   0976530    2/2000
JP   11-348143  12/1999
(Continued)

OTHER PUBLICATIONS

Computer translation, in English, of Japanese patent application No. 2005-271498, dated Oct. 6, 2005.
(Continued)

*Primary Examiner* — Joseph S Del Sole
*Assistant Examiner* — Nahida Sultana
(74) *Attorney, Agent, or Firm* — Fildes & Outland, P.C.

(57) ABSTRACT

Molded articles, such as a lens, are produced by multiple repetitions of a transfer process composed of the transformation step of bringing a transfer member (62) provided with a transfer configuration area consisting of the same configuration as that of a lens part with aspherical configuration or the configuration opposed to the lens part with aspherical configuration into contact with a photohardening resin to thereby transform the photohardening resin in conformity with the transfer configuration of the transfer member (62); the hardening step of irradiating at least a transformed area of the transformed photohardening resin with light by the use of a light irradiation unit (60) to thereby attain hardening; and the departing step of letting the photohardened resin and the transfer member depart from each other.

9 Claims, 31 Drawing Sheets

(56) References Cited

U.S. PATENT DOCUMENTS

| | | | |
|---|---|---|---|
| 4,190,621 A * | 2/1980 | Greshes | 264/1.8 |
| 4,740,343 A * | 4/1988 | Gaku et al. | 264/225 |
| 4,876,042 A * | 10/1989 | Imataki et al. | 264/39 |
| 5,214,535 A * | 5/1993 | Harris et al. | 359/565 |
| 6,650,473 B2 * | 11/2003 | Nakagoshi | 359/487.02 |
| 6,783,707 B2 * | 8/2004 | Ueda et al. | 264/1.7 |
| 6,965,476 B2 * | 11/2005 | Sato | 359/569 |
| 8,002,999 B2 * | 8/2011 | Chang | 216/26 |
| 8,109,753 B2 * | 2/2012 | Choi et al. | 425/385 |
| 8,178,026 B2 * | 5/2012 | Okinaka et al. | 264/319 |
| 8,192,637 B2 * | 6/2012 | Washiya et al. | 216/22 |
| 2003/0127759 A1 * | 7/2003 | Border et al. | 264/2.5 |
| 2004/0217495 A1 * | 11/2004 | Takeda | 264/1.1 |
| 2005/0162733 A1 * | 7/2005 | Cho et al. | 359/361 |
| 2006/0038307 A1 * | 2/2006 | Sasai | 264/2.5 |
| 2006/0176583 A1 | 8/2006 | Jin et al. | |
| 2007/0097492 A1 * | 5/2007 | Takasu et al. | 359/362 |
| 2007/0102842 A1 * | 5/2007 | Naniwa et al. | 264/219 |
| 2010/0007960 A1 * | 1/2010 | Chang | 359/599 |
| 2012/0200005 A1 * | 8/2012 | Sato | 264/293 |
| 2012/0247950 A1 * | 10/2012 | Kaida et al. | 204/192.15 |

FOREIGN PATENT DOCUMENTS

| | | |
|---|---|---|
| JP | 2001-105435 | 4/2001 |
| JP | 2002-093748 | 3/2002 |
| JP | 2003-094445 | 4/2003 |
| JP | 2004-229167 | 8/2004 |
| JP | 2005-041125 | 2/2005 |
| JP | 2005-173597 | 6/2005 |
| JP | 2005-271498 | 10/2005 |

OTHER PUBLICATIONS

Computer translation, in English, of Japanese patent application No. 2004-229167, dated Aug. 12, 2004.
Computer translation, in English, of Japanese patent application No. 2005-173597, dated Jun. 30, 2005.
Computer translation, in English, of Japanese patent application No. 11-348143, dated Dec. 21, 1999.
Computer translation, in English, of Japanese patent application No. 2002-093748, dated Mar. 29, 2002.
Computer translation, in English, of Japanese patent application No. 2001-105435, dated Apr. 17, 2001.
Computer translation, in English, of Japanese patent application No. 2005-041125, dated Feb. 17, 2005.
Computer translation, in English, of Japanese patent application No. 2003-094445, dated Apr. 3, 2003.

* cited by examiner

METHOD OF MOLDING, PROCESS FOR PRODUCING LENS, MOLDING APPARATUS, PROCESS FOR PRODUCING STAMPER, MASTER PRODUCTION APPARATUS, STAMPER PRODUCTION SYSTEM, AND STAMPER PRODUCTION APPARATUS

TECHNICAL FIELD

The present invention relates to a method of molding, a process for producing a lens, a molding apparatus, a process for producing a stamper, a master production apparatus, a stamper production system, and a stamper production apparatus.

BACKGROUND ART

Patent Document 1 discloses a method of manufacturing a micro lens array using a mold having a surface for forming a lens shape. The method includes the steps of: forming multiple lens substrates by using the mold to harden a first resin into the lens shape on a first substrate; arranging the lens substrates in an array; forming a master having a surface for forming the lens shape by plating the arrayed lens substrates; forming a mother by plating the master surface for forming the lens shape; forming a molding die using the mother; hardening and forming a second resin into the lens shape on a second substrate using the molding die; and performing dry etching to remove the second resin and part of the second substrate.

Patent Document 2 discloses a method of manufacturing a fine structure by sequentially transferring a fine pattern on the surface of a mother stamper. The method includes the steps of: (1) fixing the mother stamper at a specified position of a substrate; (2) supplying a resin between the mother stamper and the substrate; (3) pressing the mother stamper against the resin in vacuum; (4) hardening the resin; (5) separating the mother stamper from the hardened resin; (6) moving the mother stamper or the resin so as to change a relative position between the mother stamper and the resin; and (7) repeating the steps (2) through (6) for a specified number of times after the step (6).
[Patent Document 1] JP-A No. 2005-041125
[Patent Document 2] JP-A No. 2003-094445

DISCLOSURE OF THE INVENTION

Problems to be Solved by the Invention

However, the technologies disclosed in Patent Documents 1 and 2 make it difficult to fabricate a high-precision lens such as an aspherical lens.

It is an object of the present invention to provide a method of molding and a molding apparatus capable of more highly precisely molding molded articles such as a lens than conventional technologies, to provide a process for producing a higher precision lens than conventional ones and a process for producing an associated stamper, and to provide a master production apparatus, a stamper production system, and a stamper production apparatus.

Means for Solving the Problems

A first aspect of the invention is a method of molding including: a transformation step of making contact between an article to be molded and a transfer member and transforming the article to be molded to a transfer shape formed on the transfer member, the transfer shape being formed equally to or reversely to an aspherical lens portion; a hardening step of hardening at least a transformed portion of the article to be molded; a separation step of separating the article to be molded and the transfer member from each other; and a moving step of moving the transfer member to another position of the article to be molded. A transfer step of transferring the transfer shape to an article to be molded is repeated more than once.

Preferably, the transformation step includes: an injection step of injecting the article to be molded into a plurality of holes formed in a substrate; and a contact step of contacting the transfer member with the article to be molded injected into the hole.

Preferably, the injection step and the contact step are alternately repeated more than once.

Preferably, a pitch distance between positions for the transfer member to contact the article to be molded is changed or the shape of the transfer member is changed in accordance with shrinkage of the article to be molded.

Preferably, the transformation step transforms the article to be molded using the transfer member that only forms one aspherical lens shape or a shape formed reversely to the aspherical lens shape.

Preferably, an article to be molded made of a light curing material is used. The hardening step hardens the article to be molded by radiating light.

Preferably, an article to be molded made of a heat curing material is used. The hardening step hardens the article to be molded by heating.

Preferably, an aspherical lens is molded.

Preferably, a mold used for forming an aspherical lens is molded.

A second aspect of the invention is a process for producing a lens including: a molding step of molding a mold having a plurality of shapes formed reversely to the transfer shape by repeating a transfer step more than once, wherein the transfer step includes: a transformation step of making contact between an article to be molded and a transfer member having a transfer shape formed equally to an aspherical lens portion and transforming the article to be molded to the transfer shape; a hardening step of hardening at least a transformed portion of the article to be molded; a separation step of separating the article to be molded and the transfer member from each other; and a moving step of moving the transfer member to another position of the article to be molded. The process for producing a lens further includes: a lens array formation step of forming a lens array having a plurality of aspherical lens portions using a mold molded by the molding step; and a dividing step of dividing the lens array formed by the lens array formation step into a plurality of lenses having at least one aspherical lens portion.

A third aspect of the invention is a molding apparatus including: a supporting portion that supports an article to be molded; a transfer member that is contactably provided for the article to be molded supported by the supporting portion and includes a transfer shape formed equally to or reversely to an aspherical lens portion; a moving apparatus that moves at least one of the supporting portion and the transfer member so as to separate the transfer member from the article to be molded supported by the supporting portion and relatively move and contact the transfer member with another position of the article to be molded; a hardening apparatus that contacts at least the transfer member of the article to be molded and hardens a portion transformed to the transfer shape; and a control portion that controls at least the moving apparatus and the hardening apparatus so that the transfer shape is transferred more than once to the article to be molded.

A fourth aspect of the invention is a process for producing a lens including: a master production step of producing a master having at least one transfer plane shaped equally to a lens surface of a lens; a stamper production step of producing a stamper having a reversely shaped plane shaped reversely to the transfer plane; and a lens production step of producing the lens by transferring the reversely shaped plane to a lens material. The master production step includes: a transformation step of making contact between a master material and a transfer member having a transfer shape formed reversely to an aspherical lens portion of the lens and transforming the master material to the transfer shape; a hardening step of hardening at least a transformed portion of the master material; and a separation step of separating the master material from the transfer member. The transfer step of transferring the transfer shape to the master material is repeated more than once so that the transfer member successively contacts different positions on the master material at the transformation step.

Preferably, the transformation step uses the transfer member that only forms a shape formed reversely to one aspherical lens shape.

Preferably, a master material made of a light curing material is used. The hardening step hardens the master material by radiating light.

Preferably, a master material made of a heat curing material is used. The hardening step hardens the master material by heating.

Preferably, a lens material made of a light curing resin is used. The lens production step includes a hardening step of hardening a lens material between the two stampers using light radiated from between the two stampers that are placed with the reversely shaped planes opposite to each other and are provided with the reversely shaped planes shaped equally to or differently from each other.

Preferably, a lens material made of a light curing material is used. The lens production step includes a hardening step of hardening a lens material using light radiated from between the stamper and an opposed member placed opposite to the reversely shaped plane of the stamper while the lens material exists between the stamper and the opposed member.

Preferably, a molding material such as a heat curing material is used. The molded article production step hardens the heat curing material by heating.

Preferably, the stamper production step includes: a deposit step of depositing metal ion on the transfer plane of the master; and a separation step of separating the master from a stamper formed by depositing metal ion.

A fifth aspect of the invention is a process for producing a stamper including: a master production step of producing a master having at least one transfer plane shaped equally to a lens surface of a lens; and a stamper production step of producing a stamper having a reversely shaped plane shaped reversely to the transfer plane. The master production step includes: a transformation step of making contact between a master material and a transfer member having a transfer shape formed reversely to an aspherical lens portion of the lens and transforming the master material to the transfer shape; a hardening step of hardening at least a transformed portion of the master material; and a separation step of separating the master material from the transfer member. The transfer step of transferring the transfer shape to the master material is repeated more than once so that the transfer member successively contacts different positions on the master material at the transformation step.

A sixth aspect of the invention is a master production apparatus including: a supporting portion that supports a master material used for producing a master having at least one transfer plane formed equally to a lens surface of a lens; a transfer member that is contactably provided for the master material supported by the supporting portion and includes a transfer shape formed reversely to an aspherical lens portion of the lens; a moving apparatus that moves at least one of the supporting portion and the transfer member so as to contact and separate the transfer member from the master material supported by the supporting portion; a hardening apparatus that contacts at least the transfer member of the master material and hardens a portion transformed to the transfer shape; and a control portion for controlling at least the moving apparatus and the hardening apparatus to drive the moving apparatus so that the transfer member successively contacts different positions of the master material and the transfer shape is transferred to different positions of the master material more than once.

A seventh aspect of the invention is a stamper production system including: a master production apparatus used to produce a master having at least one transfer plane shaped equally to a lens surface of a lens; and a stamper production apparatus that includes a reversely shaped plane shaped reversely to a transfer plane of a master produced by the master production apparatus and produces a stamper used to produce a lens by transferring the reversely shaped plane to a lens material. The master production apparatus includes: a supporting portion that supports a master material used to produce a master; a transfer member that is contactably provided for the master material supported by the supporting portion and includes a transfer shape formed reversely to an aspherical lens portion of the lens; a moving apparatus that moves at least one of the supporting portion and the transfer member so as to contact and separate the transfer member from the master material supported by the supporting portion; a hardening apparatus that contacts at least the transfer member of the master material and hardens a portion transformed to the transfer shape; and a control portion for controlling at least the moving apparatus and the hardening apparatus to drive the moving apparatus so that the transfer member successively contacts different positions of the master material and the transfer shape is transferred to different positions of the master material more than once.

An eighth aspect of the invention is a process for producing a lens including: a stamper production step of producing a stamper having a reversely shaped plane shaped reversely to a lens surface of a lens; and a lens production step of producing the lens by transferring the reversely shaped plane to a lens material. The stamper production step includes: a transformation step of using an optically transparent stamper material, making contact between the stamper material and a transfer member including a transfer shape formed equally to an aspherical lens portion of the lens, and transforming the stamper material to the transfer shape; a hardening step of hardening at least a transformed portion of the stamper material; and a separation step of separating the stamper material from the transfer member. The transfer step of transferring the transfer shape to the stamper material is repeated more than once so that the transfer member successively contacts different positions on the stamper material at the transformation step. The lens production step includes: a transformation step of using a lens material made of a light curing material and transforming the lens material to a reversely shaped plane of the stamper; and a hardening step of hardening the lens material by radiating light to the lens material so that the light passes through the stamper.

A ninth aspect of the invention is a process for producing a stamper including: a transformation step of using an optically transparent stamper material, making contact between the stamper material and a transfer member including a transfer shape formed equally to an aspherical lens portion of a lens, and transforming the stamper material to the transfer shape; a hardening step of hardening at least a transformed portion of the stamper material; and a separation step of separating the stamper material from the transfer member. The transfer step of transferring the transfer shape to the stamper material is repeated more than once so that the transfer member successively contacts different positions on the stamper material at the transformation step. A stamper is used to produce a lens. A lens material such as a light curing material is used. The lens material is transformed to a reversely shaped plane of a stamper, the reversely shaped plane being formed reversely to a lens surface of a lens. Light is radiated to the transformed lens material so as to pass through the stamper and harden the lens material.

A tenth aspect of the invention is a stamper production apparatus including: a supporting portion that supports an optically transparent stamper material used for producing a stamper having a reversely shaped plane formed reversely to a lens surface of a lens; a transfer member that is contactably provided for the stamper material supported by the supporting portion and includes a transfer shape formed equally to an aspherical lens portion of a lens; a moving apparatus that moves at least one of the supporting portion and the transfer member so as to contact and separate the transfer member from the stamper material supported by the supporting portion; a hardening apparatus that contacts at least the transfer member of the stamper material and hardens a portion transformed to the transfer shape; and a control portion for controlling at least the moving apparatus and the hardening apparatus to drive the moving apparatus so that the transfer member successively contacts different positions of the stamper material and the transfer shape is transferred to different positions of the stamper material more than once. A stamper is produced so as to be used for producing a lens. A lens material such as a light curing material is used. The lens material is transformed to a reversely shaped plane of a stamper, the reversely shaped plane being formed reversely to a lens surface of a lens. Light is radiated to the transformed lens material so as to pass through the stamper and harden the lens material.

Effect of the Invention

The present invention can provide a method of molding and a molding apparatus capable of more highly precisely molding molded articles such as a lens than conventional technologies, to provide a process for producing a higher precision lens than conventional ones and a process for producing an associated stamper, and to provide a master production apparatus, a stamper production system, and a stamper production apparatus.

BRIEF DESCRIPTION OF DRAWINGS

FIGS. 6A and 6B show a schematic configuration of a molding apparatus according to an embodiment of the invention, wherein FIG. 6A is a plan view and FIG. 6B is a left side view;

EXPLANATIONS OF LETTERS OR NUMERALS

Figure 1:
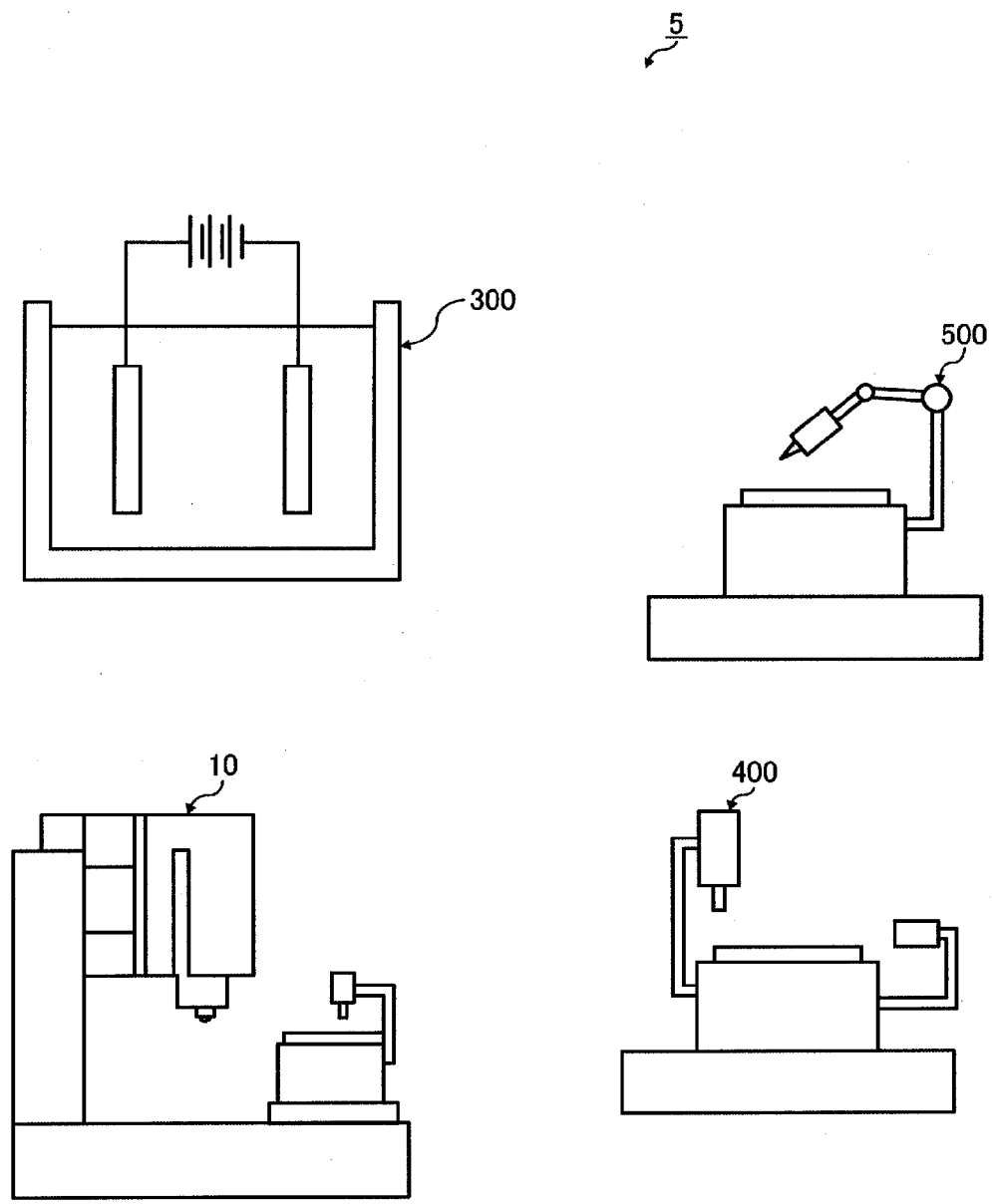
FIG. 1 shows a first optical part production system according to the invention.

5: optical part production system
10: molding apparatus
60: light irradiation unit
90: protruded portion
200: control apparatus
300: stamper production apparatus
302: container
304: electrolytic solution
306: heating apparatus
308: Ni pellet
310: power supply
400: lens array production apparatus
402: resin supply apparatus
416: light irradiation unit
418: radiation emitter
430: heating apparatus
432: heating element
500: separation apparatus
600: master
602: first transfer plane
604: second transfer plane
606: convex portion
608: concave portion
620: first stamper
622: first reversely shaped plane
626: second stamper
628: second reversely shaped plane
640: stamper
642: reversely shaped plane
643: depressed portion
644: substrate
650: lens array
652: first optical function plane
654: second optical function plane
656: convex lens portion
658: concave lens portion
680: lens array
682: optical function plane
684: convex lens portion

BEST MODE FOR CARRYING OUT THE INVENTION

Embodiments of the present invention will be described with reference to the accompanying drawings.

Figure 2:
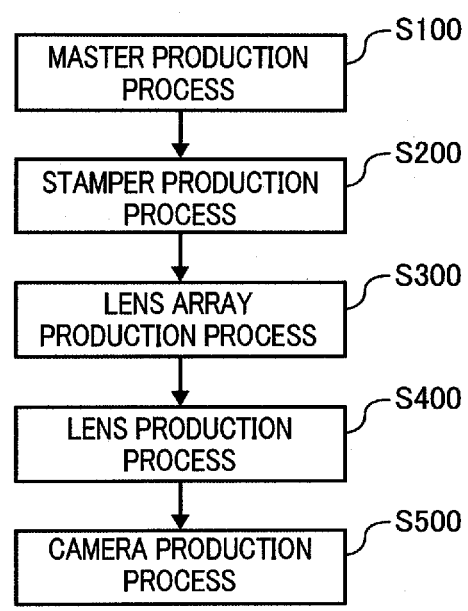
FIG. 2 shows a process of producing a lens in the optical part production system shown in FIG. 1.

FIG. 1 shows a first optical part production system according to the invention. FIG. 2 shows a process of producing a lens using the first optical part production system 5 according to the invention. The lens is to be used as a molded article.

The optical part production system 5 is used to produce optical parts such as a lens array and a lens used for a camera provided with a light receiving element such as a CMOS (Complementary Metal Oxide Semiconductor) sensor. The optical part production system 5 provides the lens production method according to the embodiment of the invention. As shown in FIG. 1, the optical part production system 5 includes a molding apparatus 10, a stamper production apparatus 300, a lens array production apparatus 400, and a separation apparatus 500. The molding apparatus 10 is used as a master production apparatus for producing a master. The molding apparatus 10 and the stamper production apparatus 300 configure a stamper production system according to the embodiment of the invention.

FIG. 2 shows how a lens is produced. A master is produced at Step S100. A stamper is produced at Step S200. A lens array is produced at Step S300. The lens is produced at Step S400. The lens produced at Step S400 can be used for camera production, for example (see Step S500). The molding apparatus 10 is used for the process of producing the master at Step S100. The stamper production apparatus 300 is used for the process of producing the stamper at Step S200. The lens array production apparatus 400 is used for the process of producing the lens array at Step S300. The separation apparatus 500 is used for the process of producing the lens at Step S400.

FIGS. 3A to 3D and FIGS. 4E to 4H illustrate steps of producing a lens 700 using the optical part production system 5 in the order of the processes shown in FIG. 2. The steps described here are used to produce a lens array 650 or a lens array 680 to be used as a molded article or a lens. The lens array 650 or the lens array 680 is cut or separated to produce the lens 700.

Figure 3A:
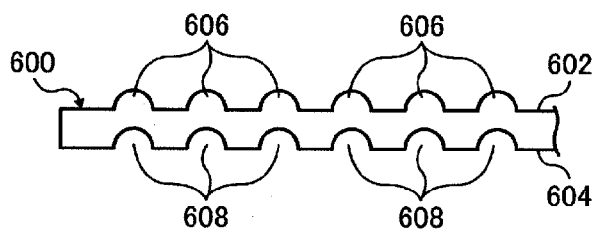
FIGS. 3A to 3D are a first explanatory diagram showing a process of producing a lens in the optical part production system shown in FIG. 1.
Figure 3B:
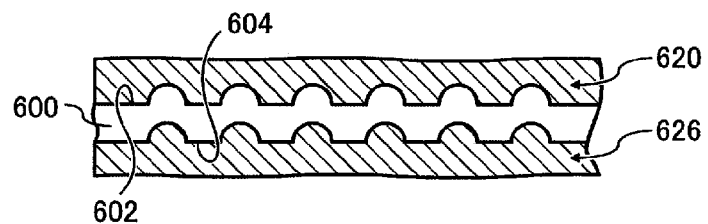
Figure 3C:
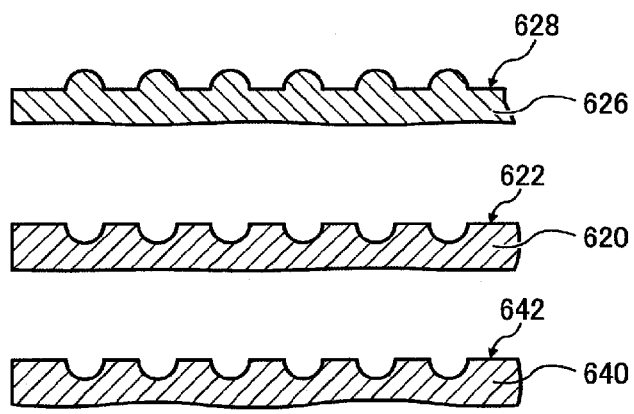
Figure 3D:
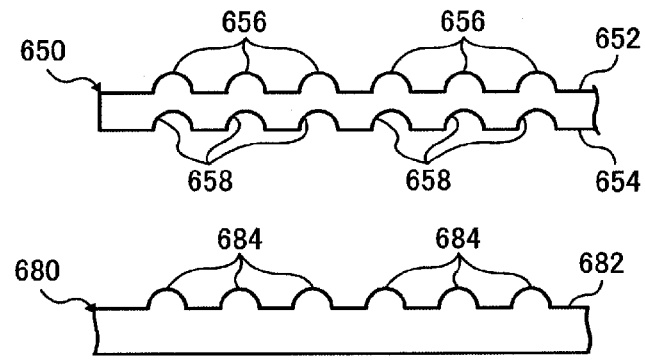

As shown in FIG. 3D, the lens array 650 provides respective molded planes. The lens array 650 includes a first optical function plane 652 and a second optical function plane 654 to be used as lens planes. The first optical function plane 652 includes multiple convex lens portions 656 that are formed in line and are used as optical parts. The second optical function plane 654 includes multiple concave lens portions 658 that are formed in line and are used as optical parts.

The optical part production system 5 produces the lens array 650 that includes the first optical function plane 652 on one side and the second optical function plane 654 on the other side. Instead, as shown in FIG. 3D, the optical part production system 5 can also produce the lens array 680 that includes an optical function plane 682 only on one side. The optical function plane 682 includes multiple convex lens portions 684 that are used as optical parts and are formed in line.

To produce the lens 700, a master 600 is first produced as shown in FIG. 3A. The master 600 is used as a master having at least one transfer plane shaped identically to the first optical function plane 652 and the second optical function plane 654 provided for the lens array 650. The master 600 includes a first transfer plane 602 shaped identically to the first optical function plane 652 and a second transfer plane 604 shaped identically to the second optical function plane 654. Convex portions 606 are formed on the transfer plane 602 at the same interval as convex lens portions 656 and are shaped equally to the convex lens portions 656. The number of convex portions 606 is the same as that of the convex lens portions 656. Concave portions 608 are formed on the second transfer plane 604 at the same interval as concave lens portions 658 and are shaped equally to the concave lens portions 658. The number of concave portions 608 is the same as that of the concave lens portions 658.

While there has been described the master 600 used for producing the lens array 650, the production of the lens array 680 uses a master shaped equally to the lens array 680 instead of the master 600. The method of producing the master 600 will be described later in more detail.

The optical part production system 5 produces the master 600 and then the stamper. As shown in FIGS. 3B and 3C, the optical part production system 5 produces a first stamper 620 and a second stamper 626 both provided for the master 600. The first stamper 620 includes a first reversely shaped plane 622 shaped oppositely or reversely to the first transfer plane 602. The second stamper 626 includes a second reversely shaped plane 628 shaped oppositely or reversely to the second transfer plane 604.

FIG. 3B shows production of the first stamper 620 and the second stamper 626. Electroforming is performed to deposit metal ion such as Ni (nickel) on the first transfer plane 602 and the second transfer plane 604 of the master 600. The metal ion is deposited to produce the first stamper 620 and the second stamper 626 that are then separated from the master 600.

There has been described the method of producing the first stamper 620 and the second stamper 626 used to produce the lens array 650. Instead of the first stamper 620 and the second stamper 626, one stamper 640 is produced to produce the lens array 680. The stamper 640 includes a reversely shaped plane 642 for a master shaped equally to the lens array 680. The production of the first stamper 620, the second stamper 626, and the stamper 640 will be described later in more detail.

Figure 4E:
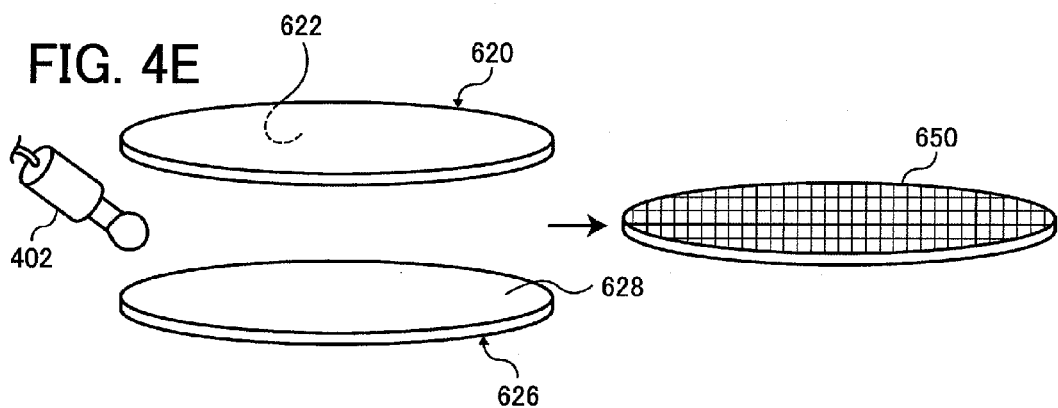
FIGS. 4E to 4H are a second explanatory diagram showing a process of producing optical parts in the optical part production system shown in FIG. 1.

Following the production of the first stamper 620 and the second stamper 626, the optical part production system 5 produces the lens array 650. To do this, for example, a nanoimprint technology is used to transfer the first reversely shaped plane 622 of the first stamper 620 and the second reversely shaped plane 628 of the second stamper 626 to a light curing resin used as a molding material. As shown in FIG. 4E, the second stamper 626 is placed so as to position the reversely shaped plane 628 upward. A resin supply apparatus 402 is used to supply the second reversely shaped plane 628 with the light curing resin. The first reversely shaped plane 622 of the first stamper 620 is overlaid on the supplied resin so as to position the first reversely shaped plane 622 downward. The light curing resin is transformed to the first reversely shaped plane 622 and the second reversely shaped plane 628. The light is then applied to the transformed light curing resin to harden it and thus produce the lens array 650.

There has been described the production of the lens array 650 using the first stamper 620 and the second stamper 626. Similarly, the stamper 640 may be used to produce the lens array 680. The above-mentioned technique uses the light curing resin as a mold material of the lens array 650. The light is radiated to the light curing resin to harden it. Instead, a heat curing resin may be used as a material of the lens array 650. The heat curing resin may be heated to be hardened. The production of the lens array 650 and the lens array 680 will be described later in more detail.

Figure 4F:
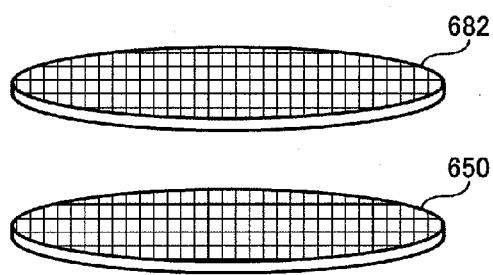
Figure 4G:
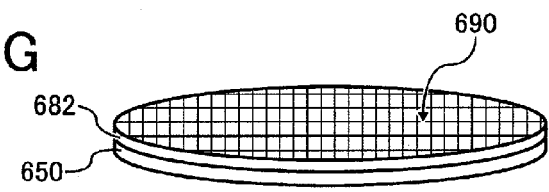
Figure 4H:
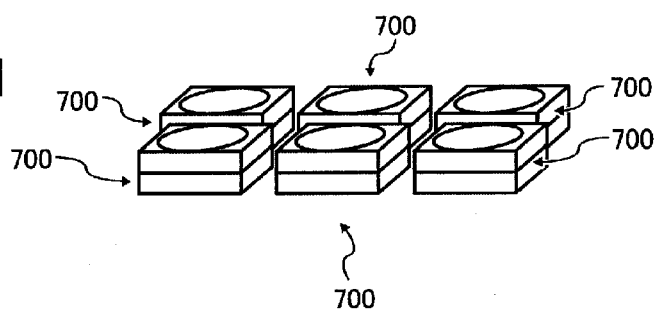

As shown in FIGS. 4F and 4G, the molded lens arrays 650 and 680 are cemented. Multiple sets of the molded lens arrays 650 and 680 may be cemented as needed. There is provided a cemented lens array 690 including multiple cemented lens arrays (cementing step). The cemented lens array 690 is divided so as to provide at least one lens portion (dividing step). The lens portion signifies at least either the convex lens portion 656 and the concave lens portion 658 or the convex lens portion 684. As shown in FIG. 4H, a lens 700 is produced so as to include at least one convex lens portion 656. For example, the lens 700 may be attached to a light receiving element of a CMOS sensor for producing cameras. A produced camera may be built in a mobile telephone, for example.

The lens array 650 and the lens array 680 may be divided without being cemented and may be used as a single-layer lens. The lens array 650, the lens array 680, and the cemented lens array 690 may be used as they are without being divided.

Figure 5:
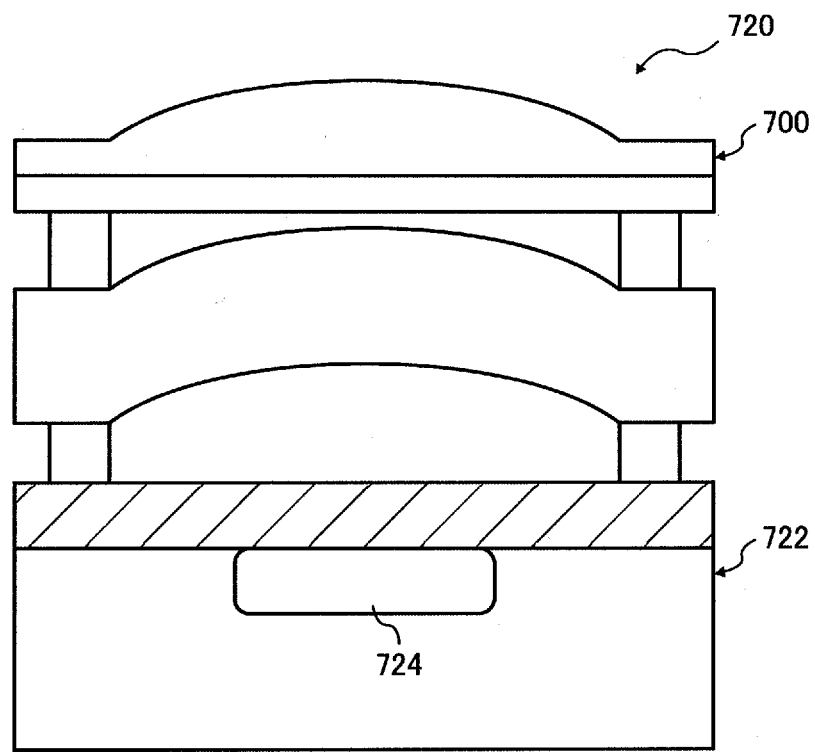
FIG. 5 shows an imaging apparatus using a lens produced in the optical part production system shown in FIG. 1.

FIG. 5 shows a camera 720 that uses the lens 700.

A light receiving element 722 is attached to the lens 700 to produce the camera 720. The light receiving element 722 uses a COMS sensor, for example, and includes a photodiode region 724. The light receiving element 722 converts input light into an electric signal to record video. The light receiving element 722 may use a CCD sensor instead of the COMS sensor.

The light from above the camera 720 is refracted through the lens 700 so as to be converged and enters the photodiode region 724. The photodiode region 724 converts the incident light into an electric signal.

Figure 6A:
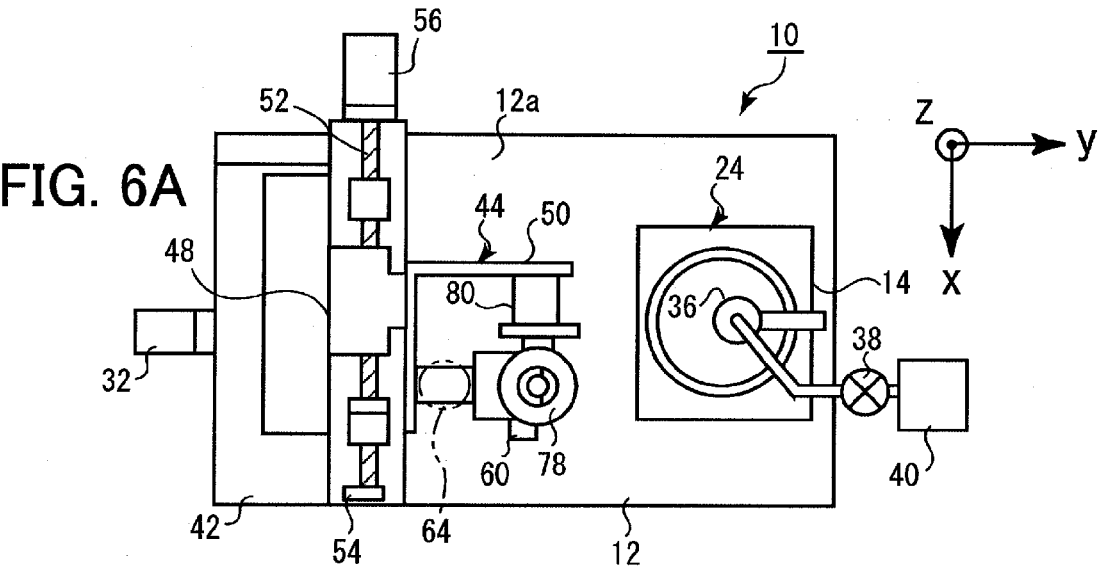
Figure 6B:
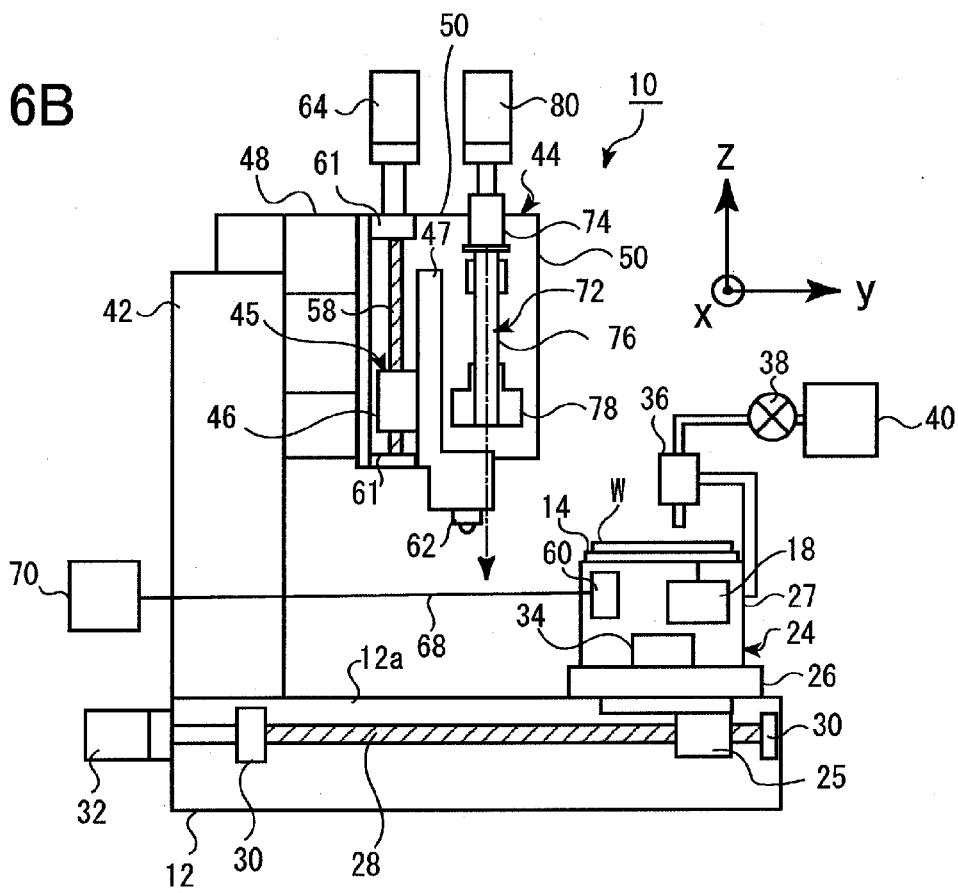

FIGS. 6A and 6B show the molding apparatus 10. As mentioned above, the molding apparatus 10 is used for molding the master 600. The molding apparatus 10 includes a base 12 that is placed on a mounting surface. A movable base 24 is supported on the base 12. A support base 14 is further supported on the top of the movable base 24.

The movable base 24 includes a lower part 26 and an upper part 27. The lower part 26 includes a projecting portion 25 that is formed so as to project downward. The upper part 27 is positioned over the lower part 26. The projecting portion 25 is attached to the base 12 so as to engage in a groove (not shown) that is formed in an upper surface 12a of the base 12 along a y-axis direction. The movable base 24 is guided through the groove in the y-axis direction and is movable on the surface 12a in the y-axis direction. The projecting portion 25 engages with a feed screw 28. The feed screw 28 is rotatably supported at bearings 30 by the base 12 so that the shaft direction (longer direction) corresponds to the y-axis direction. A left end of the feed screw in FIG. 1 connects with a y-axis motor 32 that is fixed to the base 12. Rotating the y-axis motor 32 transmits a driving force to the projecting portion 25 via the feed screw 28 to move the movable base 24 in the y-axis direction. Controlling the rotation direction of the y-axis motor 32 determines in which direction the movable base is to be moved along the y-axis.

A θ-axis motor 34 is provided for the upper part 27 of the movable base 24. The θ-axis motor 34 rotates the upper part 27 of the movable base 24 around a rotation axis perpendicular to the z-axis with reference to the lower part 26 of the movable base 24. As a whole, the movable base 24 is movable in the y-axis direction. The upper part 27 is rotatable with reference to the lower part 26.

A wafer W made of glass, for example, is mounted on the support base 14. The support base 14 supports the mounted wafer W against the direction of gravitational force. The support base 14 is coupled with a driving source 18 including a motor, for example. The support base 14 is capable of moving with the wafer W with reference to the upper part 27 of the movable base 24. The support base 14 is configured as a turning table used for a spin coat technology that applies resin to the wafer W. That is, the support base 14 is configured as a turning table used for the spin coat. The spin coat is used to apply resin to the wafer W. Instead, multiple holes h2 (see FIG. 7) may be formed in the wafer W. The molding apparatus 10 may be provided with an injection apparatus (not shown) for injecting the resin. The injection apparatus may inject the resin into the holes h2 formed in the wafer W.

The support base 14 may use an optically transparent material such as glass so as to pass light radiated from a light irradiation unit 60 to be described later. A mounting/dismounting apparatus (not shown) such as a robot may or an operator may manually mount the wafer W on the support base 14 and dismount the wafer W mounted on the support base 14.

The upper part 27 of the movable base 24 is provided with a supply apparatus 36 that supplies the wafer W with a light curing resin used as a master material. A reservoir portion 40 for reserving the light curing resin is connected to the supply apparatus 36 through a valve 38. The supply apparatus 36 is capable of supplying the light curing resin reserved in the reservoir portion 40 so that the light curing resin drops from above approximately at the center of the approximately circular wafer W (disk-shaped). The light curing resin supplied onto the wafer W spreads due to a centrifugal force from the support base 14 that rotates for a specified time period. The light curing resin is consequently applied to the surface of the wafer W with an approximately uniform thickness.

The upper part 27 of the movable base 24 is provided with the light irradiation unit 60 used as a hardening apparatus. The light irradiation unit 60 is connected to a light source 70 through an optical fiber 68 used as light transmission means. The light irradiation unit 60 is used to radiate light to the light curing resin applied to the wafer W. According to the embodiment, the light irradiation unit 60 is provided below the support base 14, the wafer W, and the light curing resin applied to the wafer W opposite to a transfer member 62 to be described later. Accordingly, the light can be radiated to the light curing resin without being interrupted by the transfer member 62 while the transfer member 62 remains in contact with the light curing resin.

The movable base 24 is attached to the base 12 and a supporting post 42 is fixed thereto. A movable unit 44 is attached to the supporting post 42 so as to be movable in an x-axis direction with reference to the supporting post 42. The movable unit 44 includes a left-sided part 48 positioned to the left of the drawing and a right-sided part 50 fixed to the left-sided part 48. The left-sided part 48 is supported by the supporting post 42 so as to be movable in the x-axis direction and is engaged with a feed screw 52. The feed screw 52 is rotatably attached to the supporting post 42 by a bearing 54 so that the screw shaft direction corresponds to the x-axis direction.

One end of the feed screw 52 is coupled with an x-axis motor 56 attached to the supporting post 42. Rotating the x-axis motor 56 transmits a driving force of the x-axis motor 56 to the left-sided part 48 via the feed screw 52. The left-sided part 48 and the right-sided part 50 of the movable unit 44 move together in the x-axis direction. Controlling the rotation direction of the x-axis motor 56 determines in which direction the movable unit 44 is to be moved along the x-axis.

The right-sided part 50 of the movable unit 44 is attached with the transfer member 62 via a supporting member 45. The supporting member 45 is attached to the movable unit 44 so as to be movable in the z-axis direction. The movable unit 45 includes: a projecting portion 46 projecting toward the left in FIG. 1; and a supporting portion 47 fixed to the projecting portion 46. The transfer member 62 is detachably attached to a downward surface of the supporting portion 47, for example. One of the transfer members 62 can be selected from differently shaped and sized ones depending on shapes of lenses to be formed and types of resin used as articles to be molded.

A feed screw 58 is screwed through the projecting portion 46. The feed screw 58 is rotatably attached to the right-sided part 50 of the movable unit 44 using bearings 61 so that the screw axis direction corresponds to the z-axis direction. The top end of the feed screw 58 is coupled to a z-axis motor 64 for the supporting member. Rotating the z-axis motor 64 for the supporting member transmits a driving force to the supporting member 45 via the feed screw 58. The supporting member 45 and the transfer member 62 supported by the supporting member 45 move together in the z-axis direction.

A detection apparatus 72 is attached to the right-sided part 50 of the movable unit 44 so as to be vertically movable (in the z-axis direction) independently of the supporting member 45. The detection apparatus 72 is used as detection means for detecting positions of the wafer W and the transfer member 62. The detection apparatus 72 includes: an imaging portion 74 exemplified by a CCD camera; a lens unit 76 provided for the imaging portion 74 near the wafer W; and a light 78 used as illuminating means for ensuring brightness for excellent imaging by the imaging portion 74. The detection apparatus 72 is attached with a z-axis motor 80 for the detection apparatus. The z-axis motor 80 for the detection apparatus is used as a driving source for moving the detection apparatus 72 in the z-axis direction with reference to the movable unit 44. Vertically moving the detection apparatus 72 allows the imaging portion 74 to focus on the transfer member 62 or the like.

As mentioned above, the supporting member 45 is attached to the movable unit 44 so as to be movable in the z-axis direction. The movable unit 44 is attached to the supporting post 42 so as to be movable in the x-axis direction. Accordingly, controlling the x-axis motor 56 and the z-axis motor 64 for the supporting member can move the transfer member 62 along with the supporting member 45 in the x-axis and z-axis directions. As mentioned above, driving the y-axis motor 32 and the θ-axis motor 34 moves and rotates the support base 14 along with the movable base 24 in the y-axis direction. Therefore, controlling the y-axis motor 32, the x-axis motor 56, the z-axis motor 64 for the supporting member, and the θ-axis motor 34 can change the relative positional relation among the wafer W, the light irradiation unit 60, and the transfer member 62.

Changing the relative positional relation between the wafer W and the transfer member 62 can allow the light curing resin applied to the wafer W and the transfer member 62 to contact or separate from each other. According to the embodiment, the y-axis motor 32, the x-axis motor 56, the z-axis motor 64 for the supporting member, and the θ-axis motor 34 as well as the feed screws 28, 52, and 58 are used as moving apparatuses for moving at least one of the light curing resin and the transfer member 62 so that the light curing resin and the transfer member 62 contact or separate from each other. Control over the y-axis motor 32, the x-axis motor 56, the z-axis motor 64 for the supporting member, and the θ-axis motor 34 will be described later in detail.

According to the embodiment mentioned above, the light curing resin includes resins such as an ultraviolet curing resin that hardens due to radiated invisible light. The above-mentioned embodiment uses the light curing resin as a master material for the master 600. The master material is capable of being transformed to the shape of the transfer member 62 when the transfer member 62 is contacted or pressed. It is possible to use appropriate materials that can harden while the transformed state is maintained. For example, it is possible to use the heat curing resin that hardens due to heating. The embodiment uses the light irradiation unit for hardening the light curing resin as a hardening apparatus for hardening an article to be molded. An appropriate hardening apparatus may be selected in accordance with a material used as an article to be molded. For example, a heater for heating a heat curing resin may be selected as the hardening apparatus when the heat curing resin is used as an article to be molded as mentioned above.

Figure 7:
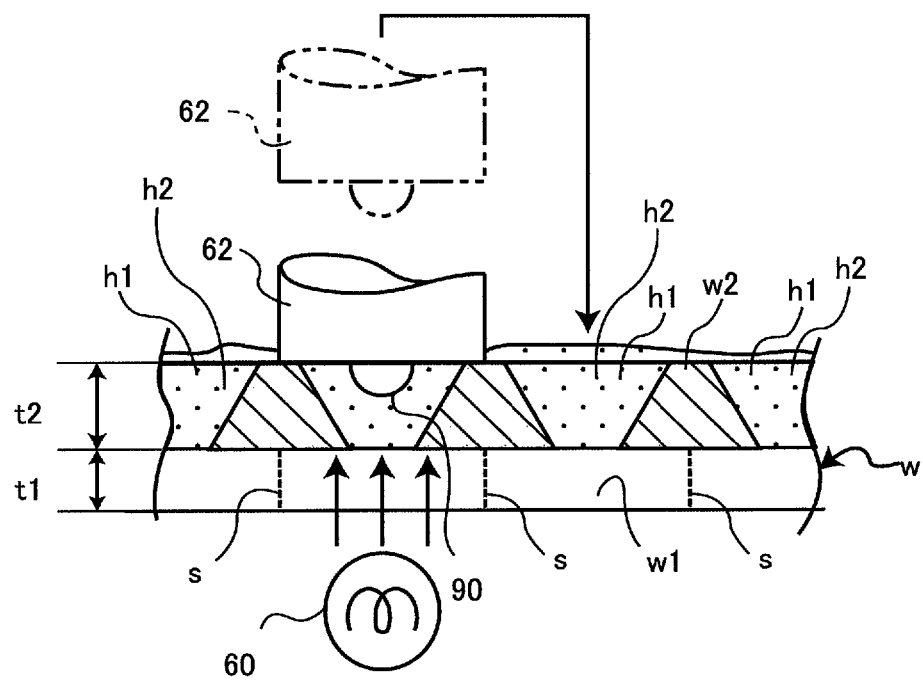
FIG. 7 is a partially sectional view showing a transfer member and a wafer included in the molding apparatus according to the embodiment of the invention.

FIG. 7 shows the transfer member 62 and the wafer W in detail.

As shown in FIG. 7, the wafer W is structured so that a holding plate W2 is layered over a substrate W1. The substrate W1 is made of an optically transparent material such as glass, for example, and has a thickness t1 of 400μ. The holding plate W2 is used to hold a light curing resin at a specified position when the resin, before being hardened, is liquid and highly fluid, for example. The holding plate W2 is made of silicon, for example, and has a thickness t2 of 725μ, for example. Multiple through-holes h are vertically formed in the holding plate W2. Each through-hole is conic so as to be narrowed from top to bottom.

Multiple through-holes h1 are formed in the holding plate W2 positioned above the substrate W1. The substrate W1 seals the bottom of the through-hole h1. As a result, the substrate W1 contains multiple concave holes h2 so formed as to be sealed at the bottom and opened toward the top.

The transfer member 62 is made of metal, for example. The transfer member 62 is shaped equally to a lens portion 1312 (e.g., see FIGS. 32A to 32C to be described later) used as an aspherical lens portion or has a transfer shape formed reversely to the lens portion 1312. The transfer shape is formed as a protruded portion 90, for example. The transfer member 62 is used to transform the light curing resin to the shape of the protruded portion 90. Hardening the transformed light curing resin signifies transfer of the transfer shape formed on the transfer member 62 to the light curing resin. The protruded portion 90 is aspherical and is formed by mechanically processing the metal transfer member 62 such as machining using machine tools including a machining center, for example.

An article to be molded needs to be highly accurately molded by transferring the transfer shape formed on the transfer member 62. Accordingly, for example, the transfer shape needs to be highly accurately formed on the transfer member 62 as the protruded portion 90. The protruded portion 90 has an aspherical shape and is difficult to process. Processing of the transfer member 62 often requires a long time and high costs. For this reason, the embodiment forms only one transfer shape on the transfer member 62 to shorten the process time and reduce the costs.

The aspherical shape signifies a surface shape other than a curved surface shape that corresponds to part of a spherical surface. In optical parts such as a lens portion 312, the aspherical shape is expressed by the following aspherical shape equation (1).

$$z = C \cdot \rho^2 / [1 + \{1 - (1+k1) \cdot C^2 \cdot \rho^2\}^{1/2}]$$ equation (1)

where C denotes the inverse of curvature radius R; ρ denotes the height of a mirror face from an optical axis; z denotes the sag quantity; and k1 denotes the constant of the cone.

In FIG. 7, the spin coat is used to apply the light curing resin to the entire upward surface of the wafer W. The applied light curing resin flows into the through hole h of the holding plate W2 so as to be held by the holding plate W2. As shown in FIG. 7, the transfer member 62 contacts the held light curing resin so that at least the protruded portion 90 contacts the light curing resin. In this state, the light irradiation unit 60 is used to radiate light to and near a position of the light curing resin in contact with the protruded portion 90. The light curing resin hardens to transfer the transfer shape formed on the protruded portion to the light curing resin. After the light curing resin hardens, the transfer member 62 is separated from the wafer W as indicated by a dash-double-dot line in FIG. 7. As indicated by an arrow in FIG. 7, for example, the transfer member 62 moves so as to contact an unhardened resin held in a through hole h adjacent to the through hole h that holds the hardened resin.

Figure 8:
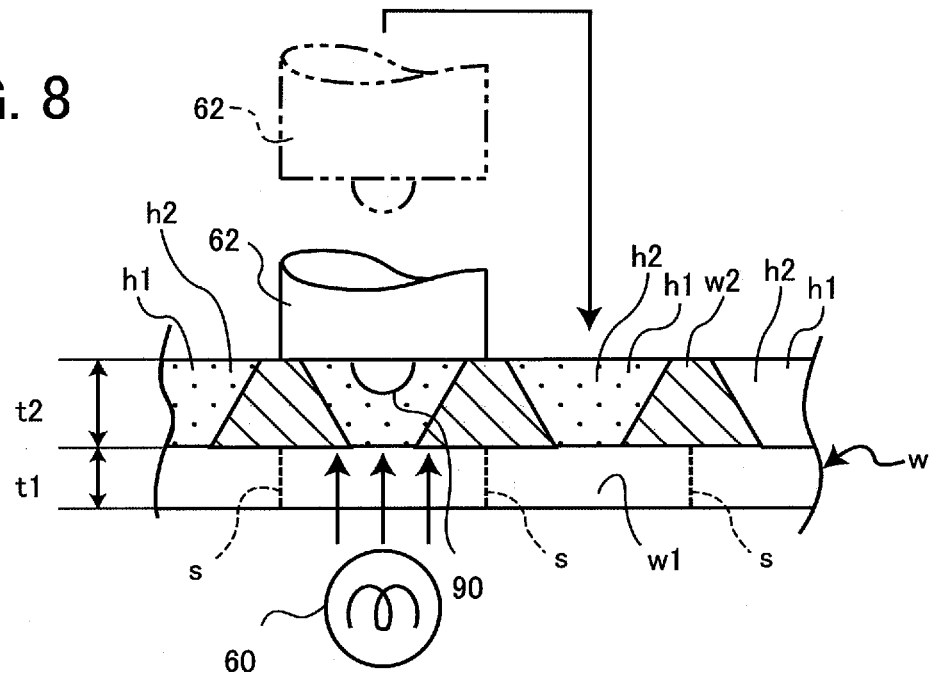
FIG. 8 is an explanatory diagram showing a modification example of a process to inject a light curing resin into a hole formed in a wafer used for the molding apparatus according to the embodiment of the invention.

There has been described the case where the spin coat is used to apply the light curing resin to the entire upward surface of the wafer W. Instead, as shown in FIG. 8, an injection apparatus (not shown) may be used to inject the light curing resin into multiple holes h2 formed in the wafer W. The transfer member 62 contacts the light curing resin held by the holding plate W2 so that at least the protruded portion 90 contacts the light curing resin. The protruded portion 90 contacts the light curing resin held in one hole h2 and the light is radiated. At this time, the light curing resin is already injected in a hole h2 adjacent to that hole h2. After the light curing resin hardens in one hole h2, the transfer member 62 is separated from the wafer W as indicated by a dash-double-dot line in FIG. 8. As indicated by an arrow in FIG. 8, for example, the transfer member 62 moves so as to contact an unhardened resin held in a hole h2 adjacent to the hole h2 that holds the hardened resin. The transfer member 62 now contacts the resin held in that adjacent hole h2. Before the transfer member 62 moves to a further adjacent hole h2, the injection apparatus injects the light curing resin into a still further adjacent hole h2.

As shown in FIG. 8, the injection apparatus is used to inject the light curing resin into the hole h2. The light curing resin is transformed to the transfer member (transformation step). For this purpose, the light curing resin is injected into the wafer W where multiple holes h2 are formed in advance (injection step). The transfer member 62 contacts the light curing resin injected into the hole h2 (contact step). To transform the light curing resin, the light curing resin is injected into the hole h2 (injection step) and the transfer member 62 contacts the light curing resin injected into the hole h2 (contact step). In addition, the injection step and the contact step are alternately repeated twice or more.

Figure 9:
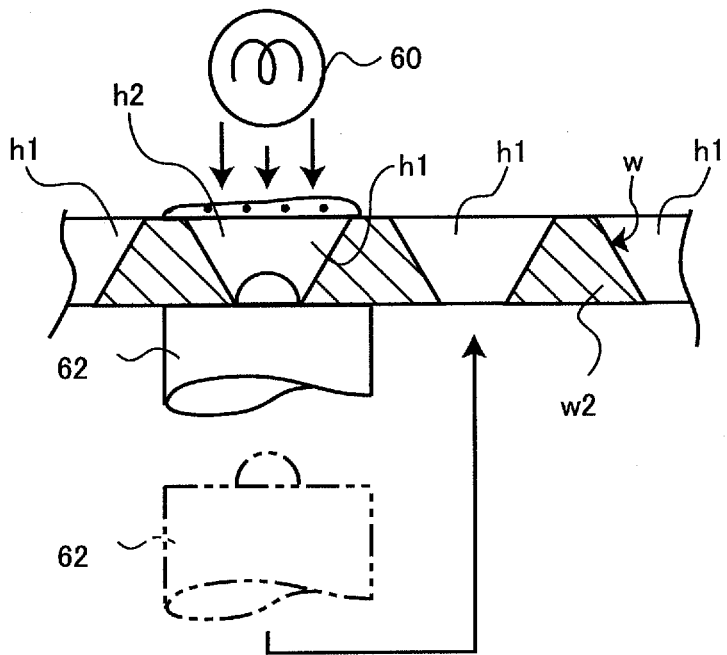
FIG. 9 is a partially sectional view showing a first modification example of a transfer member and a wafer used for the molding apparatus according to the embodiment of the invention.

FIG. 9 shows a first modification example of the wafer W. The wafer W according to the above-mentioned embodiment uses a layer of the substrate W1 and the holding plate W2. A substrate W1 according to the first modification example uses only a holding plate W2. When the substrate W1 according to the first modification example is used, the configuration of the molding apparatus 10 needs to be modified so as to be capable of the following. The transfer member 62 contacts the holding plate W2 from below so as to cover at least one of through holes h1 from below. The light curing resin is supplied from above into the hole h2 that is formed by being covered from below. The light is radiated from above to the light curing resin supplied to the hole h2. The wafer W according to the first modification example is used as follows. After the light curing resin injected into the hole h2 hardens, the transfer member 62 moves so as to cover the adjacent through hole h1 from below. The injection apparatus then injects the light curing resin into the adjacent hole h2 that is formed by covering the through hole h1. FIG. 8 uses the same reference numerals to depict the same parts or components as those for the wafer W according to the above-mentioned embodiment and a detailed description is omitted for simplicity.

As mentioned above, the holding plate W2 holds the light curing resin when the wafer W to be used includes or is equivalent to the holding plate W2. The light curing resin is available at multiple small-volume spaces in small quantity. When not held by the holding plate W2, the light curing resin is continuously available all over the wafer W surface. When the light curing resin shrinks, the accumulated shrinkage causes an error between the position to transfer the shape of the transfer member 62 and an intended position. The holding plate W2 can solve this problem. It is possible to decrease the quantity of light curing resin to be used in comparison with a case of applying the light curing resin all over the substrate W1 surface without using the holding plate W2.

Figure 10:
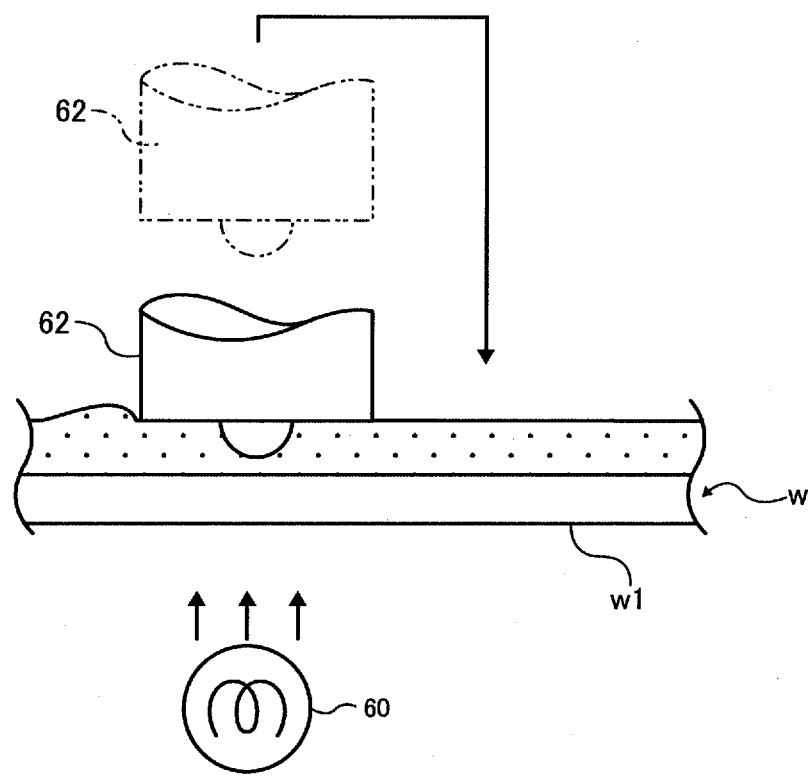
FIG. 10 is a partially sectional view showing a second modification example of a transfer member and a wafer used for the molding apparatus according to the embodiment of the invention.

FIG. 10 shows a second modification example of the wafer W.

The wafer W according to the above-mentioned embodiments uses a layer of the substrate W1 and the holding plate W2. According to the second modification example, however, the wafer W includes the substrate W1 without using the holding plate W2. When the wafer W according to the second modification example is used, the spin coat is used to apply the light curing resin all over the wafer W surface. The transfer member 62 sequentially transfers the shape to the light curing resin applied to the wafer W.

Since the holding plate W2 is unavailable, the light curing resin is applied all over the surface of the wafer W according to the second modification example. When the light curing resin shrinks, the accumulated shrinkage causes an error between the position to transfer the shape of the transfer member 62 and an intended position. To prevent such error from occurring, it is desirable to change a pitch distance between positions for contact of the transfer member 62 with the light curing resin in accordance with the shrinkage of the light curing resin to be used. That is, there is a pitch distance between one position for transferring the transfer member 62 and another position that is adjacent to that position and allows the transfer member to contact the light curing resin. It is desirable to configure and change that pitch distance so as to be longer than an intended pitch distance after the light curing resin to be used hardens in accordance with a shrinking percentage. FIG. 10 uses the same reference numerals to depict the same parts or components as those for the wafer W according to the above-mentioned embodiment and a detailed description is omitted for simplicity.

Figure 11:
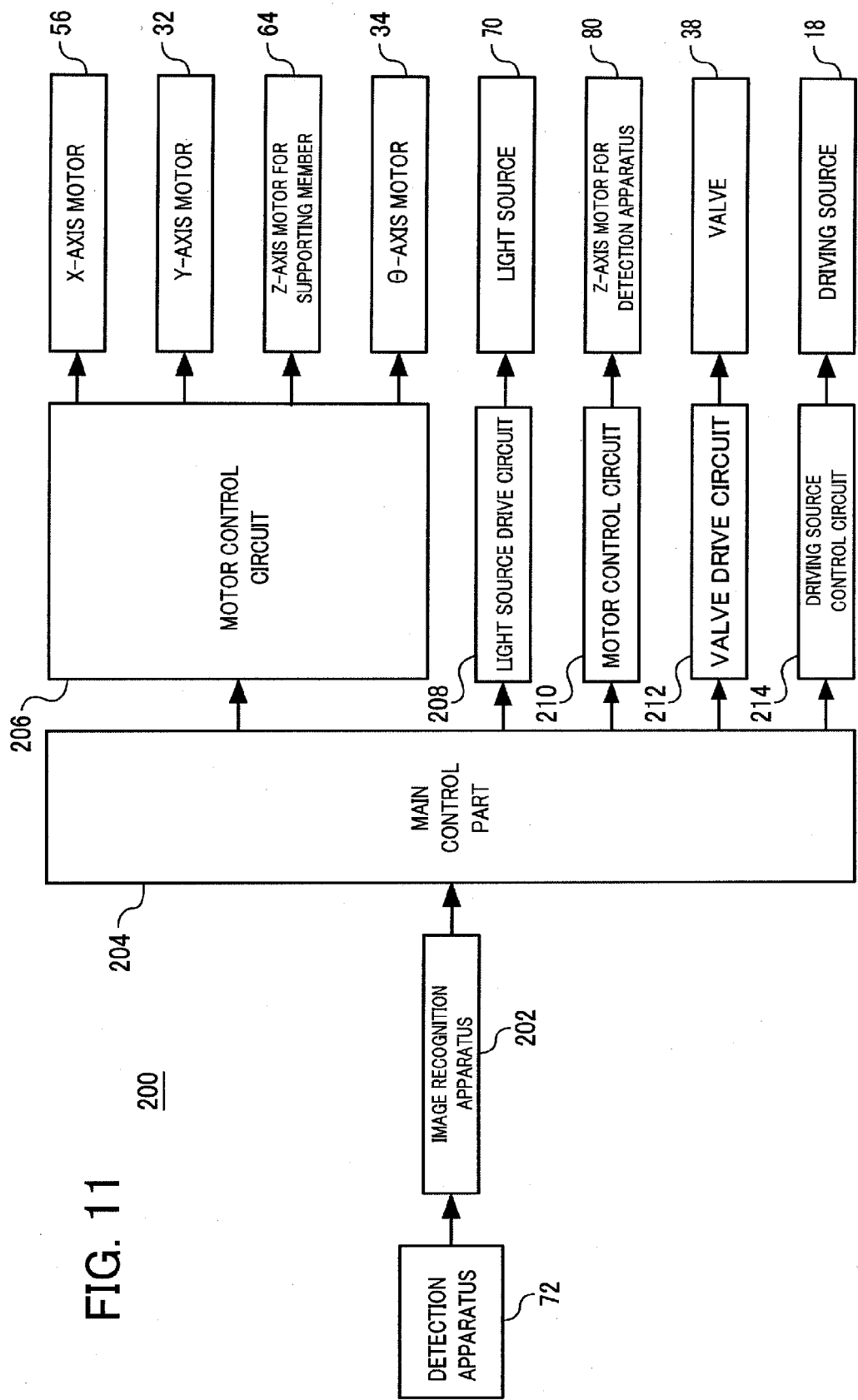
FIG. 11 is a block diagram showing a control apparatus included in the molding apparatus according to the embodiment of the invention.

FIG. 11 is a block diagram showing a control apparatus 200 included in the molding apparatus 10.

As shown in FIG. 11, the control apparatus 200 includes a main control portion 204 supplied with outputs from the detection apparatus 72 via an image recognition apparatus 202 that recognizes an image captured by the detection apparatus 72. The main control portion 204 controls a motor control circuit 206 to control the y-axis motor 32, the x-axis motor 56, the z-axis motor for the supporting member 64, and the θ-axis motor 34. The main control portion 204 controls a light source drive circuit 208 to control the light source 70. The main control portion 204 controls a motor control circuit 210 to control the z-axis motor 80 for the detection apparatus. The main control portion 204 controls a valve drive circuit 212 to control the valve 38. The main control portion 204 controls a driving source control circuit 214 to control the driving source 18. As mentioned above, the molding apparatus 10 may be provided with an injection apparatus (not shown) that injects the light curing resin into the hole h2 formed in the wafer W. In this case, the control apparatus 200 also controls the injection apparatus.

Figure 12:
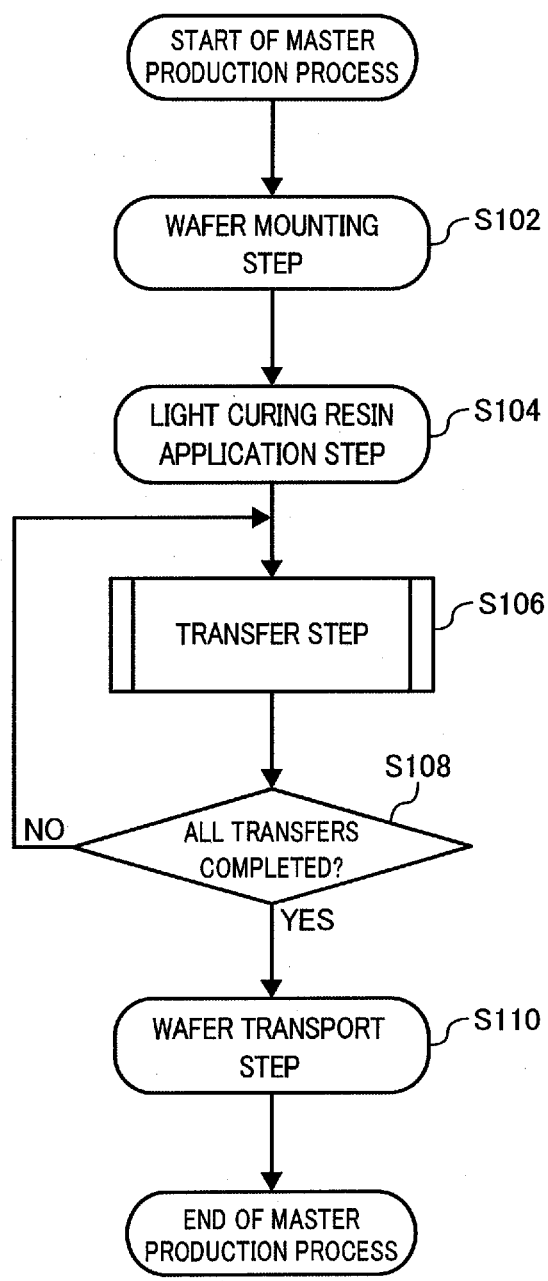
FIG. 12 is a first flowchart showing operations of the molding apparatus according to the embodiment of the invention.

FIG. 12 is a first flowchart showing control of the control apparatus 200 over the molding apparatus 10 and diagrams steps for producing the master 600. The first flowchart shows steps of applying the light curing resin all over the wafer W using the spin coat, for example.

When a sequence of steps starts, Step S102 performs a mounting step of mounting the wafer W on the support base 14. Step S104 performs a light curing resin application step of applying the light curing resin to the wafer W. During the light curing resin application step, the main control portion 204 controls the valve drive circuit 212 to open the valve 38 for a predetermined time period and supply the light curing resin to the surface of the wafer W. After completely supplying the light curing resin, the main control portion 204 controls the driving source control circuit 214 to drive the driving source 18 for a specified time period. The driving source 18 is driven to rotate the support base 14. Due to a centrifugal force, the light curing resin supplied to the wafer W mounted on the support base 14 spreads almost evenly over the surface of the wafer W.

Step S106 performs a transfer step of transferring the transfer shape formed on the transfer member 62 to the light curing resin. The transfer step at Step S106 will be described later in detail.

Step S108 determines whether or not all the transfer steps are completed. For example, the transfer step may be repeated 1500 through 2400 times. Step S106 determines whether or not the last transfer step is reached. Control returns to Step S106 when Step S108 determines that the last transfer step is not reached. Control proceeds to Step S110 when Step S108 determines that the last transfer step is reached.

Since the transfer is completed on the light curing resin applied to the wafer W, Step S110 transports the water W mounted on the support base 14 outside the molding apparatus 10. The molding apparatus 10 may not include an apparatus such as a robot that mounts the wafer W on the support base 14 and transports the wafer W from the molding apparatus 10. In this case, an operator manually mounts the wafer W on the support base 14 and removes the wafer W from the molding apparatus 10. The main control portion 204 omits control over the operations at Steps S102 and S110.

Figure 13:
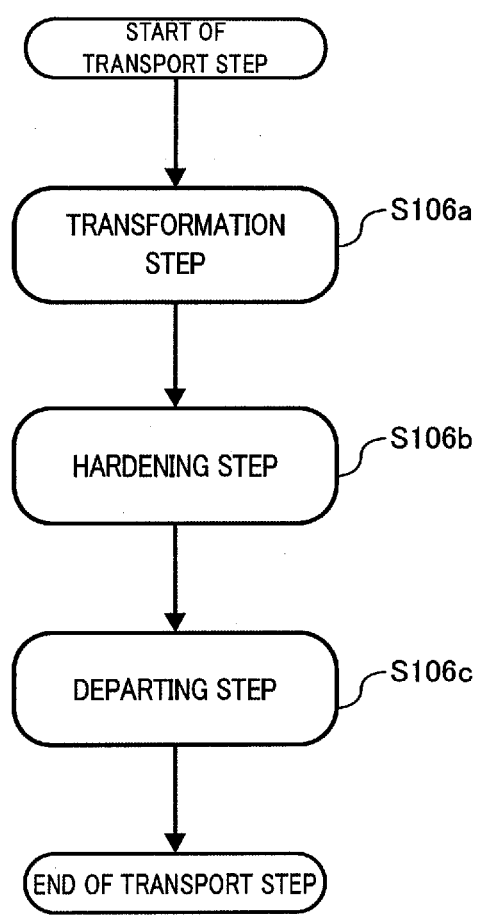
FIG. 13 is a first flowchart showing transfer operations of the molding apparatus according to the embodiment of the invention.

FIG. 13 is a first flowchart showing the transfer step of the control apparatus 200. The flowchart shows the detail of control over the transfer step (Step S106) for transferring the transfer shape formed on the transfer member 62 to the heat curing resin when, for example, the spin coat is used to apply the light curing resin to the entire surface of the wafer W.

When the transfer step starts, Step S106a performs a transformation step of transforming the light curing resin applied to the wafer W in accordance with the transfer shape formed on the transfer member 62. At Step S106a, the main control portion 204 controls the motor control circuit 206 to drive the y-axis motor 32, the x-axis motor 56, the z-axis motor 64 for the supporting member, and the θ-axis motor 34. At least one of the transfer member 62 and the support base 14 is moved so that the transfer member 62 contacts a specified position of the light curing resin applied to the wafer W to transform the light curing material.

The transformation step at Step S106a may use data that is detected by the detection apparatus 72 and is image-processed by the image recognition apparatus 202. Based on the data, position correction data may be generated for the support base 14 and the transfer member 62 so that the transfer member 62 contacts the light curing resin at a correct position. Based on the correction data, the main control portion 204 may provide control so as to move at lest one of the transfer member 62 and the support base 14.

The transformation step at Step S106a transforms the light curing resin to the protruded portion 90 of the transfer member 62. The protruded portion 90 of the transfer member 62 is aspherically shaped and is processed so as to be shaped reversely to an aspherically depressed portion 608 of the master 600. According to the description above, the transfer member 62 having the protruded portion 90 is used to form the depressed portion 608 in the master 600. In addition, the transfer member having a depressed portion may be used to form a protruded portion in the master 600. The step selectively uses the transfer member 62 having a transfer portion processed reversely to a shape to be formed.

The type of light curing resin to be used is taken into consideration in choosing the transfer member 62. Transfer members to be selected are provided with differently sized and shaped protruded portions 90 in accordance with shrinking percentages of light curing resins to be used even when the same shape is finally formed. That is, the transfer member 62 is changed in accordance with shrinkage during formation of the light curing resin.

Step S106*b* performs a hardening step of hardening the light curing resin that is transformed to the transfer member 62 by contact with the transfer member 62. That is, the main control portion 204 controls the light source drive circuit 208 so that the light source 70 radiates light for a predetermined time period to at least part of the light curing resin transformed due to contact with the transfer member 62. After the transfer step at Step S106*b*, the light curing resin hardens while it is transformed to the lens portion shape. One lens portion is formed on the light curing resin.

Step S106 performs a separation step of separating the hardened light curing resin from the transfer member 62. The main control portion 204 controls the motor control circuit 206 to drive the z-axis motor 64 for the supporting member so that the transfer member 62 in contact with the heat curing resin moves upward.

Steps S106*a*, S106*b*, and S106*c* mentioned above are completed to terminate the transfer step as a sequence. Terminating the transfer member forms one depressed portion 608 on the light curing resin. As shown in FIG. 12, the transfer step is repeated until all transfers are completed in accordance with the number of lens portions to be formed. As many depressed portions 608 as the number of repeated transfer steps are formed on the light curing resin to form the second transfer plane 604 of the master 600. While the transfer step is repeated, the control apparatus 200 controls the transformation step at S106*a* so that the transfer member 62 successively contacts different positions on the light curing resin.

The same step as mentioned above is performed to form the first transfer plane 602 by forming a protruded portion 606 on the other surface of the master 600 than that forms the second transfer plane 604. At this time, the transfer member 62 is replaced by another whose first transfer plane 602 is shaped to form the protruded portion 606. While there has been described the master 600 where the first transfer plane 602 is formed on one surface and the second transfer plane 604 is formed on the other surface, it may be preferable to independently produce a master having the first transfer plane 602 on one surface and another master having the second transfer plane on one surface.

Figure 14:
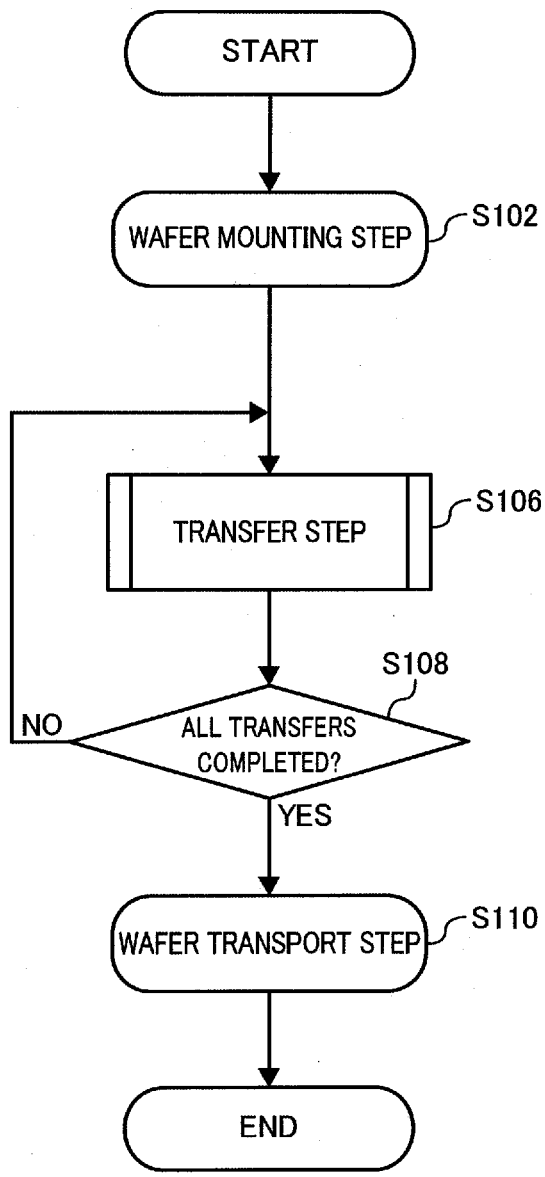
FIG. 14 is a second flowchart showing operations of the molding apparatus according to the embodiment of the invention.

FIG. 14 is a second flowchart showing control of the control apparatus 200 over the molding apparatus 10 and depicts steps of molding the master 600. The above-mentioned first flowchart shows the steps of applying the light curing resin to the entire surface of the wafer W using the spin coat, for example. On the other hand, the second flowchart shows steps of using an injection apparatus (not shown) to inject the light curing resin into multiple holes h2 (see FIG. 7) formed in the wafer W.

Of the steps of the above-mentioned first flowchart, Step S102 performs the mounting step of mounting the wafer W on the support base 14, Step S104 applies the light curing resin to the entire surface of the wafer W, Step S106 transfers the transfer shape formed on the transfer member 62 to the light curing resin, Step S108 determines whether or not all the transfer steps are completed, and Step S110 transports the wafer W outside the molding apparatus 10.

On the other hand, the steps of the second flowchart are void of Step S104 that applies the light curing resin to the entire surface of the wafer W. As will be described later, the transfer step at Step S106 injects the resin into the hole h2 formed in the wafer W.

Figure 15:
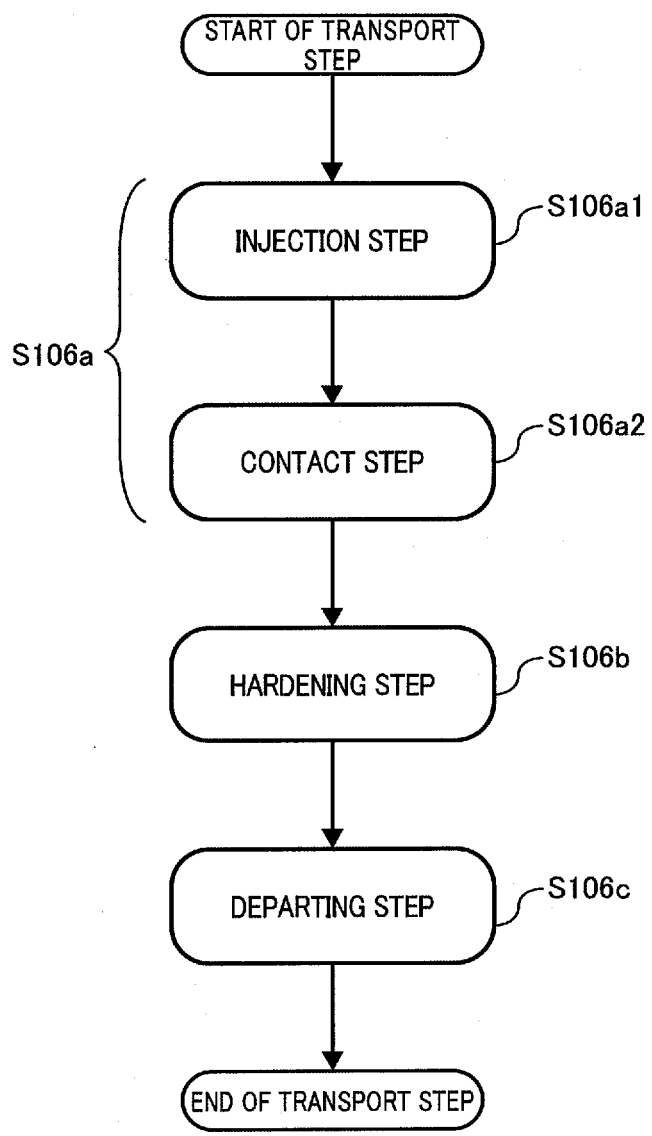
FIG. 15 is a second flowchart showing transfer operations of the molding apparatus according to the embodiment of the invention.

FIG. 15 is the second flowchart showing the transfer step of the control apparatus 200 when the injection apparatus is used to inject the light curing resin into the holes h2 formed in the wafer W. The flowchart shows in detail control over the transfer step (Step S106) that transfers the transfer shape formed on the transfer member 62 to the heat curing resin.

When the transfer step starts, Step S106*a* performs a transformation step of transforming the light curing resin to the transfer shape formed on the transfer member 62. The transformation step includes an injection step (Step S106*a*1) and a contact step (Step S106*b*2). Step S106*a*1 injects the light curing resin into one of the holes h2 formed on the wafer W. Step S106*b*2 contacts the transfer member 62 with the light curing resin that is injected into one of the holes h2 at Step S106*a*1. At Step S106*a*, the main control portion 204 controls the injection apparatus to inject the light curing resin into one of the holes h2 formed in the wafer W. The main control portion 204 then controls the motor control circuit 206 to move at least one of the transfer member 62 and the support base 14 so that the transfer member 62 contacts the hole h2 injected into one of the holes h2.

Step S106*b* performs the hardening step of hardening the light curing resin formed to the transfer member 62. The main control portion 204 allows the light source 70 to radiate light to at least the resin injected into the hole h2 at Step S106*a*1. After the hardening step at Step S106*b*, the light curing resin injected into the hole h2 hardens as transformed to the shaped of the lens portion.

Step S106*c* performs the separation step of separating the transfer member 62 from the hardened light curing resin injected into the hole h2.

A sequence of transfer steps terminates at Steps S106*a*1, S106*a*2, S306*b*, and S106*c* as mentioned above. When the transfer step terminates, the light curing resin is injected into one of the holes h2 formed in the wafer W. The light curing resin is transformed and hardened in accordance with the transfer shape formed on the transfer member 62 to form one protruded portion 606. As shown in FIG. 14, the transfer step is repeated as many times as the number of lens portions to be formed until all the transfer steps terminate. The result is to form as many protruded portions 606 as the number of transfer steps repeated on the light curing resin.

Figure 16:
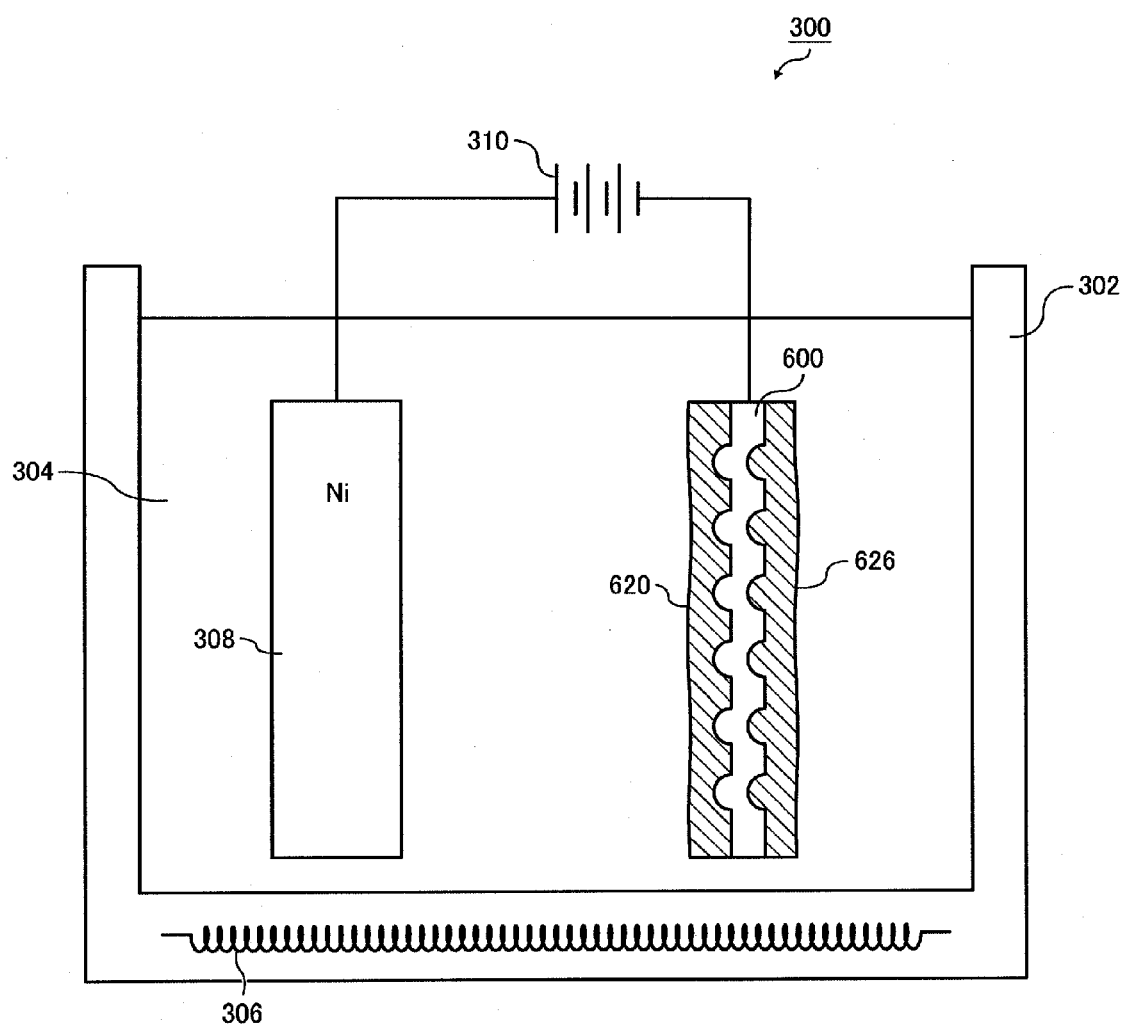
FIG. 16 shows a stamper production apparatus included in the optical part production system shown in FIG. 1.

FIG. 16 shows the stamper production apparatus 300.

The stamper production apparatus 300 includes a container 302. The container 302 contains an electrolytic solution 304 such as an Ni plating solution. For example, the bottom of the container 302 is provided with a heating apparatus 306 that heats the electrolytic solution 304 and keeps it at an appropriate temperature. An Ni pellet 308 is placed in the electrolytic solution 304. The stamper production apparatus 300 includes a power supply 310 that uses the Ni pellet 308 as an anode and the master 600 as a cathode. For example, sputtering is used to form a conductive layer on the surface of the master 600.

When the power supply 310 supplies power, the stamper production apparatus 300 according to the above-mentioned configuration melts Ni from the Ni pellet 308 as the anode. Ni is deposited on the plated surface of the master 600 as the cathode to form a first stamper 620 and a second stamper 626. The first stamper 620 and the second stamper 626 are then removed from the master 600 and are used to produce the lens array 680 as mentioned above.

Figure 17:
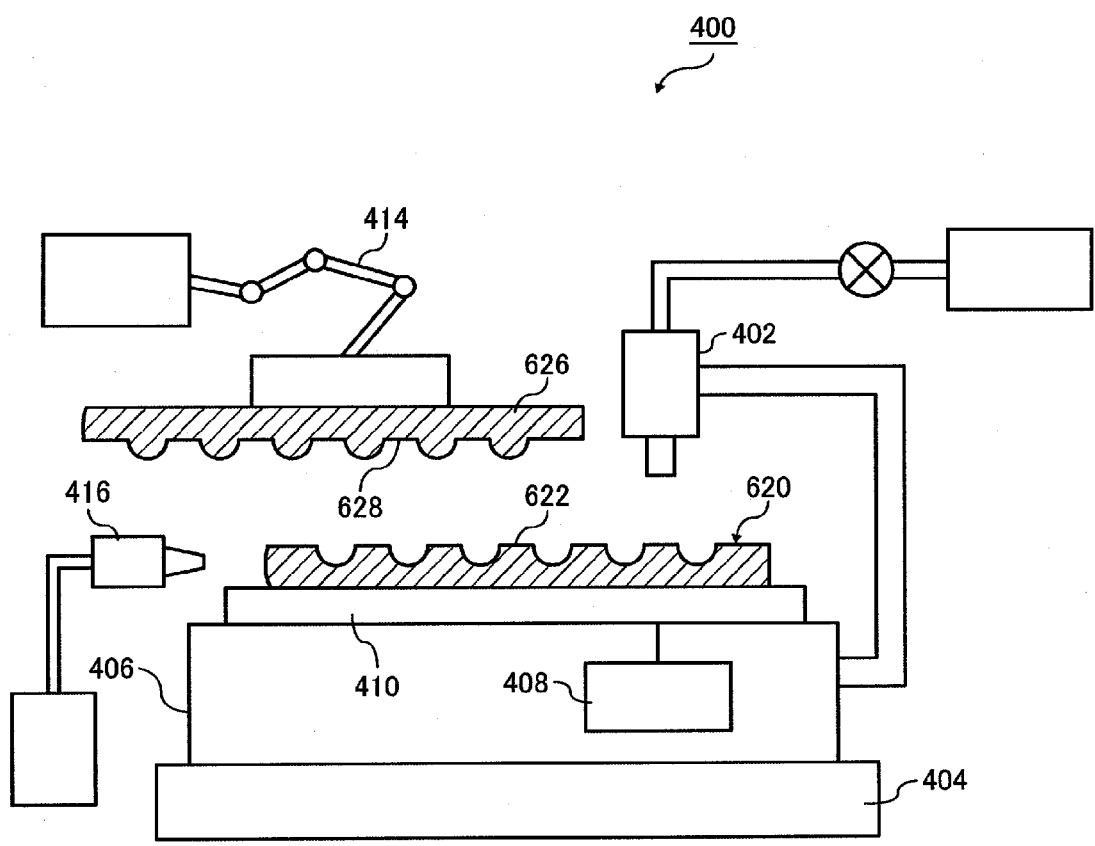
FIG. 17 shows a lens array production apparatus that is included in the optical part production system shown in FIG. 1 and uses a light curing resin as a lens array material.

FIG. 17 shows the lens array production apparatus 400.

As shown in FIG. 17, the lens array production apparatus 400 includes a base 404. A support base 406 is mounted on the base 404. The support base 406 is coupled to a driving source 408 such as a motor. The support base 406 is provided with a rotating platform 410 used as a rotating table for spin coat. The first stamper 620 is mounted on the rotating platform 410, for example.

The lens array production apparatus 400 includes the resin supply apparatus 402, a moving apparatus 414, and a light irradiation unit 416. The resin supply apparatus 402 is used to supply the light curing resin to the first stamper 620 mounted on the rotating platform 410. The moving apparatus 414 uses a robot arm, for example, and is capable of holding the second stamper 626 and moving it while holding so as to be placed on the first stamper 620 mounted on the rotating platform 410. The light irradiation unit 416 radiates light for hardening the light curing resin. While FIG. 14 shows only one light irradiation unit 416, it may be preferable to provide multiple light irradiation units 416 around the rotating platform 410. For example, four light irradiation units 416 may be provided at an interval of 90 degrees.

In the lens array production apparatus 400 according to the above-mentioned configuration, the resin supply apparatus 402 supplies the light curing resin to the upward surface (first reversely shaped plane 622) of the first stamper 620 mounted on the rotating platform 410. The driving source 408 transmits a driving force to the rotating platform 410 that then rotates to spread the light curing resin over the surface of the first stamper 620. The moving apparatus 414 transports the second stamper 626 so as to be stacked on the spread light curing resin. The light curing resin is transformed to the first reversely shaped plane 622 of the first stamper 620 and the second reversely shaped plane 628 of the second stamper 626. The light irradiation unit 416 radiates light to the transformed light curing resin. The transformed light curing resin hardens to produce the lens array 680.

Figure 18:
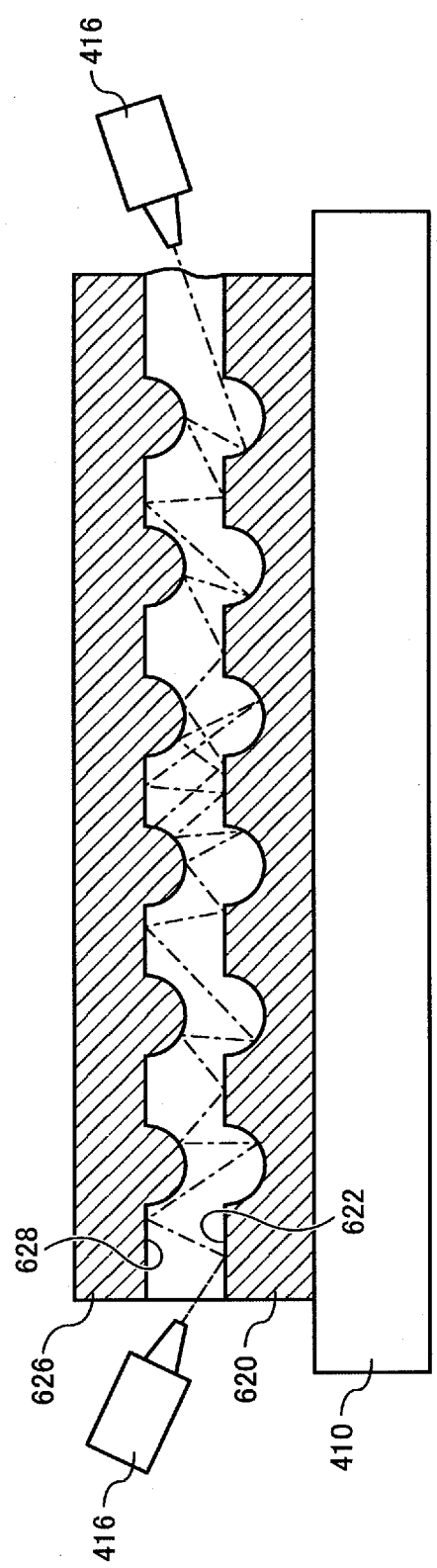
FIG. 18 is a first diagram illustrating a process for hardening a light curing resin using the lens array production apparatus shown in FIG. 17.

FIG. 18 shows a process in which the light curing resin hardens due to light radiated from the light irradiation unit 416 for producing the lens array 650.

For example, four light irradiation units 416 (two thereof shown in FIG. 18) radiate light to the light curing resin between the first stamper 620 and the second stamper 626. The light diffuses through the light curing resin so as to reflect between the first reversely shaped plane 622 of the first stamper 620 made of Ni and the second reversely shaped plane 628 of the second stamper 626 made of Ni. As a result, the light curing resin hardens.

Figure 19:
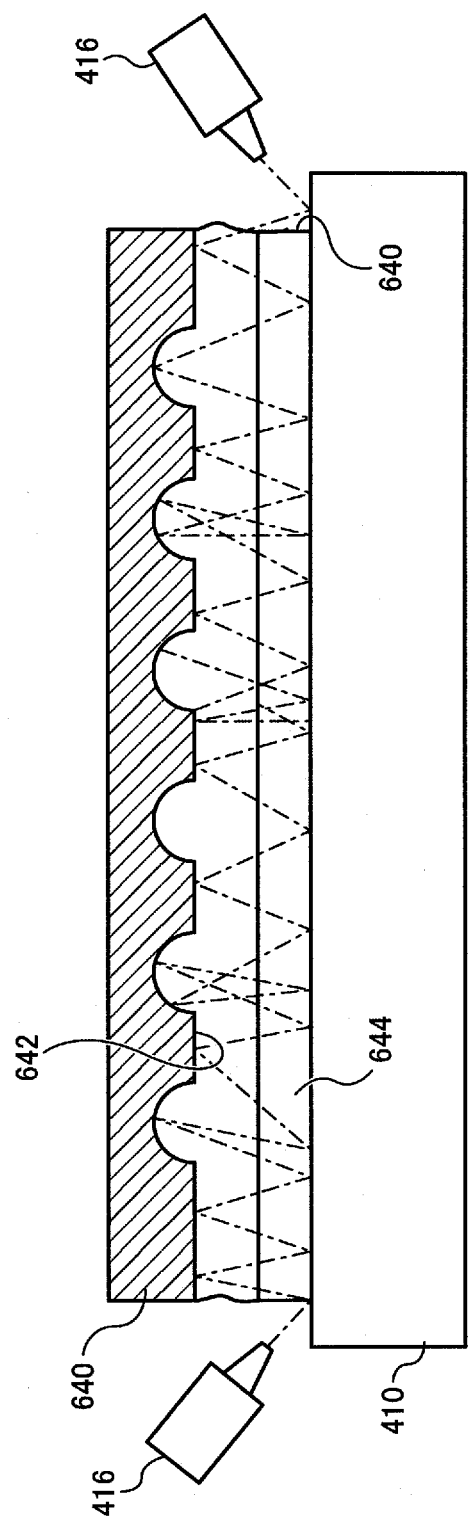
FIG. 19 is a second diagram illustrating a process for hardening a light curing resin using the lens array production apparatus shown in FIG. 17.

FIG. 19 shows a process in which the light curing resin hardens due to light radiated from the light irradiation unit 416 for producing the lens array 680.

As shown in FIG. 19, the production of the lens array 680 uses the mirror-finished rotating platform 410. The rotating platform 410 is used as an opposed member opposite to the lens array 650. A substrate 644 such as a glass substrate is made of an optically transparent material and is placed on the surface of the rotating platform 410. The light curing resin is spread over the substrate 644. The stamper 640 is placed so as to be stacked on the spread light curing resin. In this state, four light irradiation units 416 (two thereof shown in FIG. 19) radiate light to the light curing resin between the stamper 640 and the substrate 644. As shown in FIG. 19, the light diffuses through the light curing resin so as to reflect between the downward surface (reversely shaped plane 642) of the Ni stamper 640 and the surface of the mirror-finished rotating platform 410. As a result, the light curing resin hardens.

Figure 20:
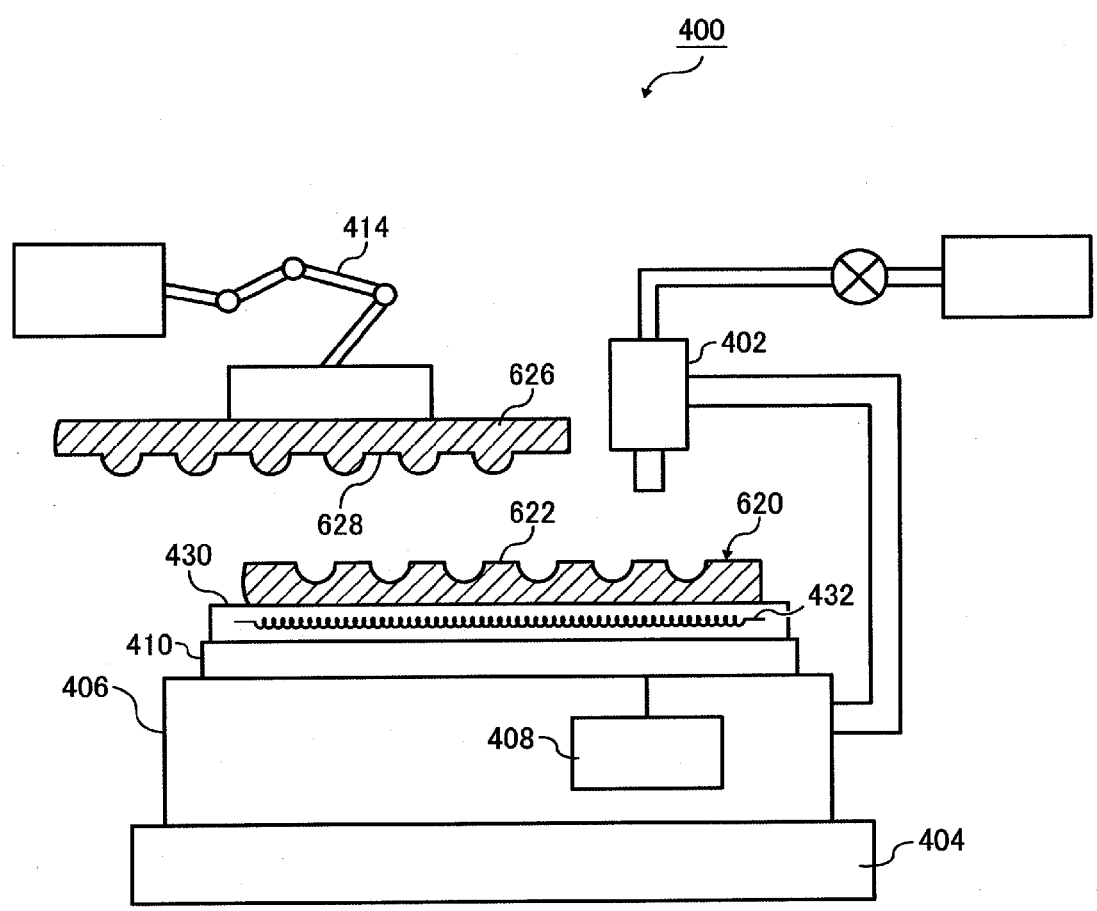
FIG. 20 shows a modification example of the lens array production apparatus that is included in the optical part production system shown in FIG. 1 and uses a heat curing resin as a lens array material.

FIG. 20 shows a modification example of the lens array production apparatus 400.

As mentioned above, the lens array production apparatus 400 uses the light curing resin as a lens array material for the lens array 650 or the like and provides steps of hardening the light curing resin. On the other hand, the lens array production apparatus 400 according to the modification example uses a heat curing resin as a lens array material and is capable of providing steps of hardening the heat curing resin.

As shown in FIG. 20, the lens array production apparatus 400 according to the modification example is void of the light irradiation unit 416 included in the above-mentioned lens array production apparatus 400. Instead, the lens array production apparatus 400 according to the modification example includes a heating apparatus 430 used as heating means for hardening the heat curing resin by heating. The heating apparatus 430 is mounted on the upward surface of the rotating platform 410. The heating apparatus 430 is shaped into a circular plate whose diameter is greater than that of a stamper such as the first stamper 620 mounted on the upward surface. The heating apparatus 430 contains a heating element 432 inside. The heating element 432 is supplied with power from an unshown power supply for heating.

In the lens array production apparatus 400 configured as mentioned above according to the modification example, the first stamper 620 is placed on the upward surface of the heating apparatus 430. The resin supply apparatus 402 supplies the heat curing resin to the first reversely shaped plane 622 of the stamper 620. The reversely shaped plane 628 of the second stamper 626 is pressed to contact the heat curing resin supplied from the resin supply apparatus 402. After the above-mentioned steps, the heat curing resin is transformed to the shapes of the first reversely shaped plane 622 of the first stamper 620 and the second reversely shaped plane 628 of the second stamper 626.

The heating element 432 is supplied with power while the heat curing resin is transformed to the shapes of the first reversely shaped plane 622 of the first stamper 620 and the second reversely shaped plane 628 of the second stamper 626. The heating element is heated when it is supplied with power. The first stamper 620 made of Ni transmits the heat to the light curing resin. The light curing resin thus hardens.

The above-mentioned lens array production apparatus 400 is configured to use only the light curing resin as a lens array material. The lens array production apparatus 400 according to the modification example is configured to use only the heat curing resin as a lens array material. The lens array production apparatus 400 may be otherwise configured to be capable of selectively using the light curing resin and the heat curing resin as lens array materials. In this case, the lens array production apparatus 400 is provided with the light irradiation unit 416 and the heating apparatus 430. When the light curing resin is used, the light irradiation unit 416 is used to harden the light curing resin. When the heat curing resin is used, the heating apparatus 430 is used to harden the heat curing resin.

Figure 21:
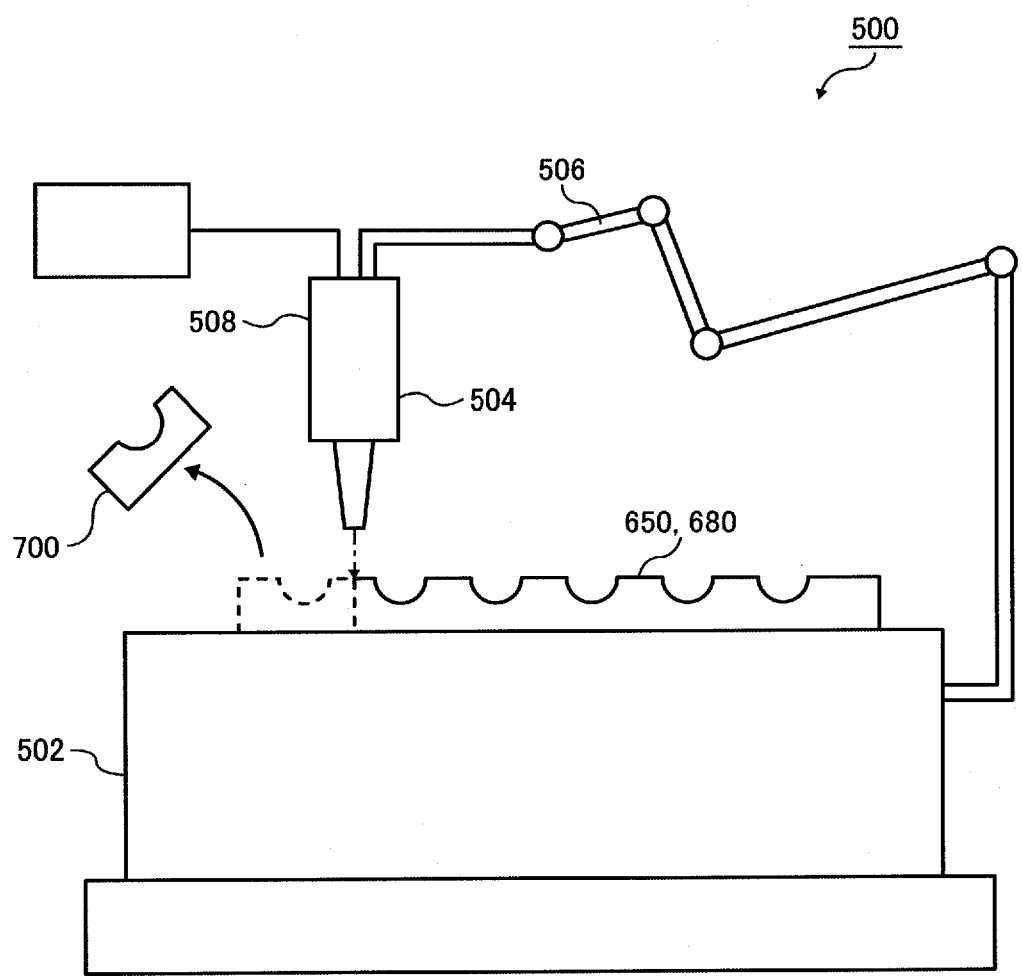
FIG. 21 shows a separation apparatus included in the optical part production system shown in FIG. 1.

FIG. 21 shows the separation apparatus 500.

The separation apparatus 500 includes a mounting base 502 and a laser radiation apparatus 504. The mounting base 502 is used to mount the lens arrays 650 and 680, for example. The laser radiation apparatus 504 radiates a laser beam to the lens array 650 mounted on the mounting base 502 to cut and separate the lens array 650 or the like. The laser radiation apparatus 504 is provided with a laser light source 508 and is movably supported by a moving apparatus 506 such as a robot arm.

The separation apparatus 500 radiates a laser beam for cutting and separating the lens arrays 650 and 680 to produce the lens 700.

Figure 22:
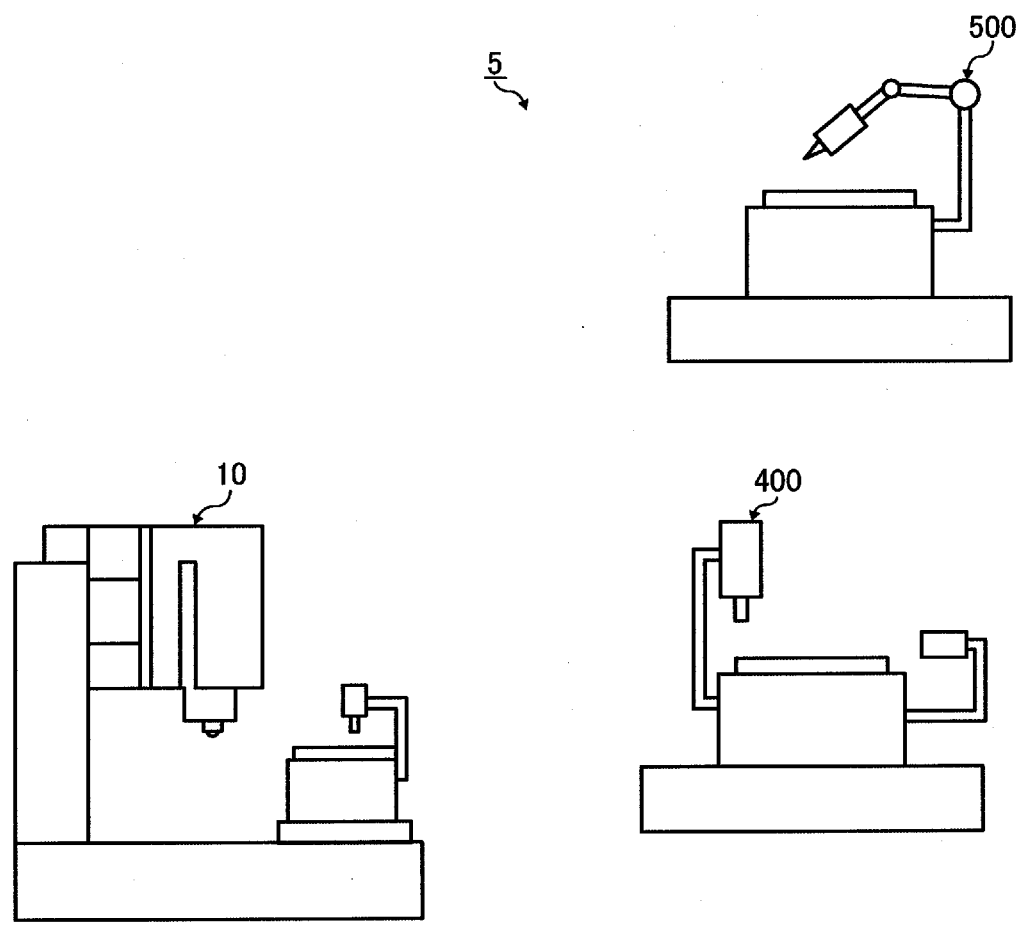
FIG. 22 shows a second optical part production system according to the invention.
Figure 23:
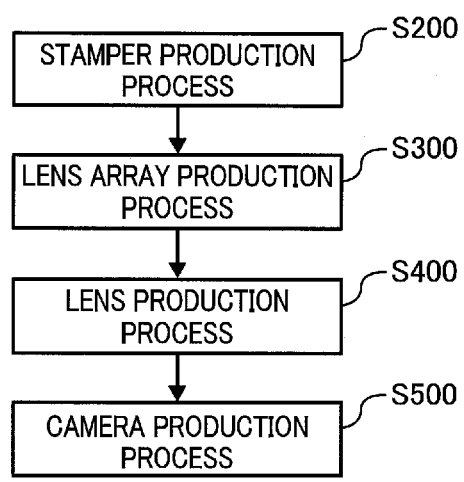
FIG. 23 shows a process of producing a lens in the optical part production system shown in FIG. 22.

FIG. 22 shows a second optical part production system 5 according to the invention. FIG. 23 shows steps of producing a lens used as a molded article through the use of the second optical part production system 5. The second optical part production system 5 is used for producing optical parts such as lenses similarly to the first optical part production system 5 according to the invention as mentioned above. The second optical part production system 5 provides a method for producing molded articles according to embodiments of the invention.

As mentioned above, the first optical part production system 5 includes the molding apparatus 10, the stamper production apparatus 300, the lens array production apparatus 400, and the separation apparatus 500. As shown in FIG. 22, however, the second optical part production system 5 is void of the stamper production apparatus 300. Instead, the second optical part production system 5 includes the molding apparatus 10, the lens array production apparatus 400, and the separation apparatus 500. In the first optical part production system 5, the molding apparatus 10 is used as a master production apparatus for producing masters. In the second optical part production system, however, the molding apparatus 10 is used as a stamper production apparatus for producing stampers.

As mentioned above, the first optical part production system 5 produces a lens as follows. Step S100 produces a master. Step S200 produces a stamper. Step S300 produces a lens array. Step S400 produces a lens. The lens produced at Step S400 is used to produce cameras.

In the second optical part production system 5 as shown in FIG. 23, however, Step S200 produces a stamper. Step S300 produces a lens array. Step S400 produces a lens. The lens produced at Step S400 is used to produce cameras. Unlike the first optical part production system 5, the second optical part production system 5 produces no master.

In the second optical part production system 5, the molding apparatus 10 is used at Step S200 for producing the stamper. The lens array production apparatus 400 is used at Step S300 for producing the lens array. The separation apparatus 500 is used at Step S400 for producing the lens.

FIGS. 24C, 24D, 24G and 24H show the steps of producing the lens 700 by using the second optical part production system 5 in the order of the steps shown in FIG. 23.

Figure 24C:
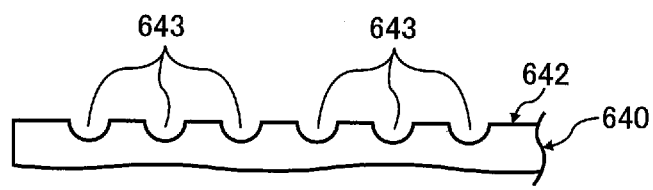
FIGS. 24C, 24D, 24G and 24H are an explanatory diagram showing a process of producing a lens in the optical part production system shown in FIG. 22.
Figure 24D:
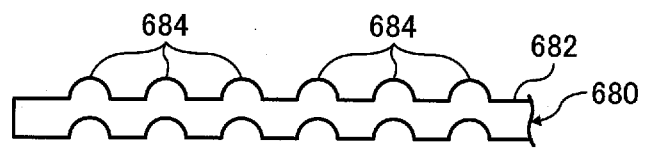
Figure 24G:
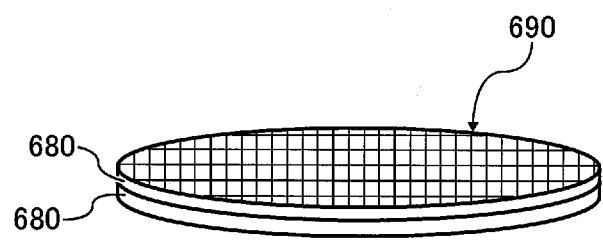
Figure 24H:
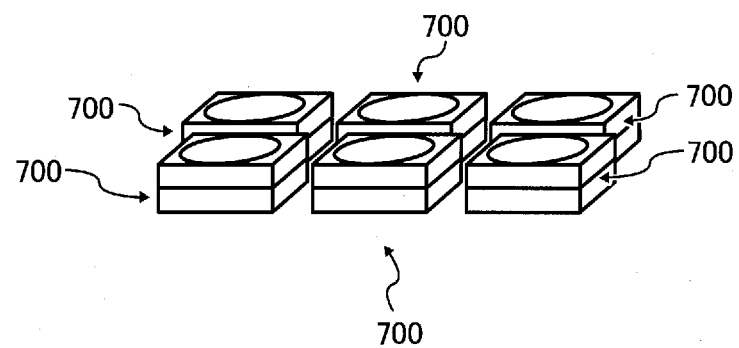

To produce the lens 700, the stamper 640 is produced as shown in FIG. 24C. The lens array 680 is produced as shown in FIG. 24D. Depending on needs, multiple lens arrays 650 are produced or the cemented lens array 690 is produced by bonding the lens array 650 to the other lens array as shown in FIG. 24G. The cemented lens array 690 is divided to produce the lens 700 as shown in FIG. 24H.

FIG. 24C shows a partially enlarged view of the stamper 640 produced by the second optical part production system 5.

As mentioned above, the first optical part production system 5 produces a lightproof stamper made of Ni. On the other hand, the second optical part production system 5 produces the stamper 640 using an optically transparent material capable of transmitting light. Resin is used as an optically transparent material. The stamper 640 includes the reversely shaped plane 642 that is shaped reversely to the optical function plane 682 of the lens array 680 as a molded article. As many depressed portions 643 as the convex lens portions 684 are formed on the reversely shaped plane 642 at the same interval as that of the convex lens portions 684. The depressed portion 643 is shaped reversely to the convex lens portion 684 of the lens array 680.

As mentioned above, the molding apparatus 10 produces the stamper 640.

That is, the first optical part production system 5 forms the stamper 640 having multiple depressed portions 643 through the steps similar to those of producing the master 600 using the molding apparatus 10. It should be noted that an optically transparent resin is used to form the stamper 640.

FIG. 24D shows a partially enlarged view of the lens array 680 produced in the second optical part production system 5.

The lens array 680 is the same as the lens array 680 produced in the first optical part production system mentioned above and includes the optical function plane 682 used as a modeling plane. The optical function plane 682 includes multiple convex lens portions 684 orderly formed so as to be used as optical parts. As mentioned above, the lens array production apparatus 400 produces the lens array 680. The production of the lens array 680 using the lens array production apparatus 400 will be described later in detail.

FIG. 24G shows the cemented lens array 690 produced in the second optical part production system 5. FIG. 24G shows an example of bonding two lens arrays 680 produced in the second optical part production system 5. The cemented lens array 690 may include the lens array 680 bonded to the lens array 650 (see FIGS. 3A to 3D) produced in the first optical part production system 5 mentioned above, for example.

FIG. 24H shows the lens 700 produced in the second optical part production system 5. Similarly to the first optical part production system 5 mentioned above, the separation apparatus 500 is used for cutting and separating the cemented lens array 690 to produce the lens 700. The separation apparatus 500 included in the second optical part production system 5 is the same as the separation apparatus 500 (see FIG. 21) included in the first optical part production system 5 mentioned above.

Figure 25:
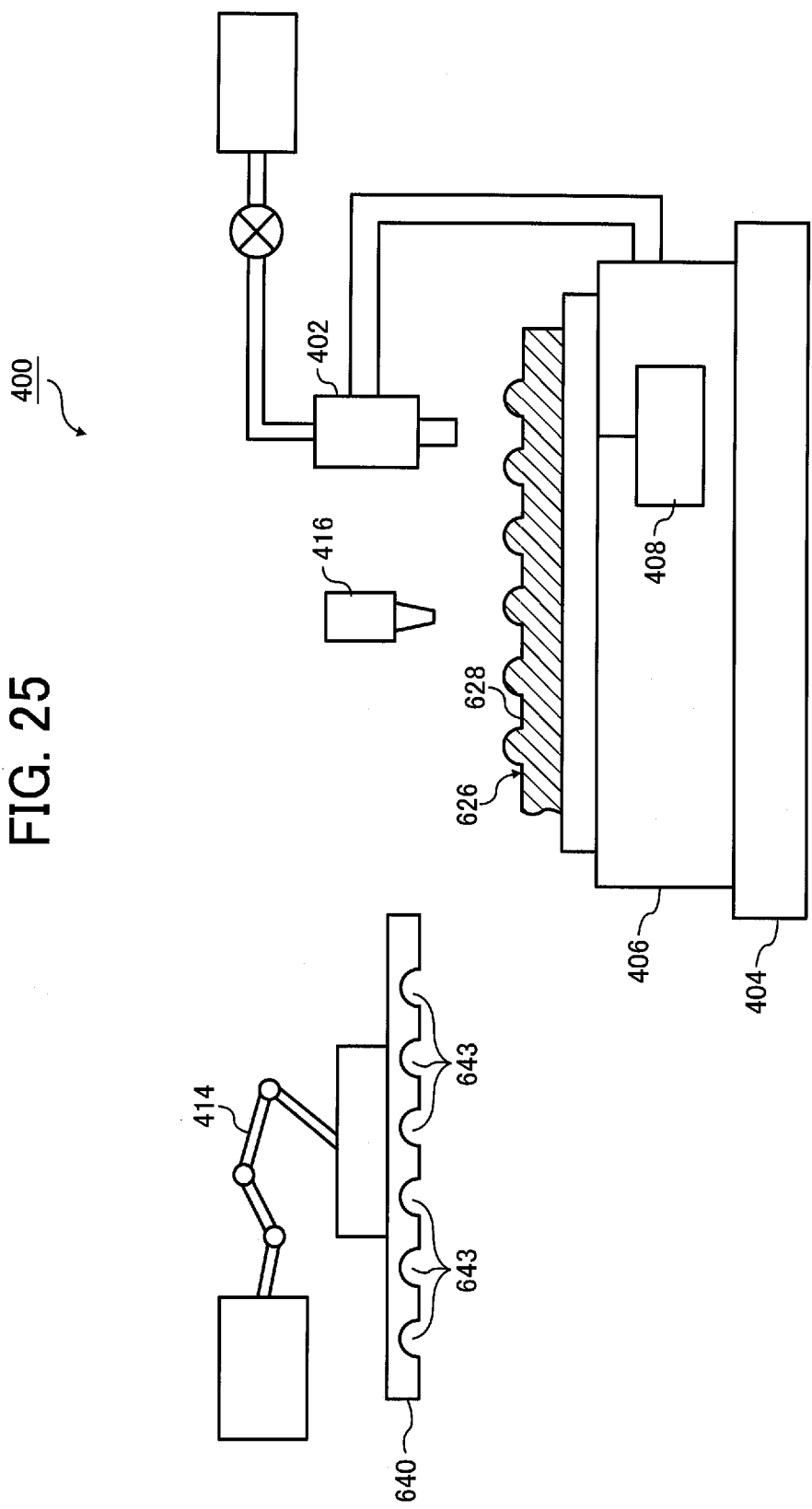
FIG. 25 shows a lens array production apparatus included in the optical part production system shown in FIG. 22.

FIG. 25 shows the lens array production apparatus 400 included in the second optical part production system 5.

In the first optical part production system 5 mentioned above, the lens array production apparatus 400 includes multiple light irradiation units 416 such as four at an interval of 90 degrees around the rotating platform 410. The light irradiation units 416 are placed so as to sideways radiate the light to the light curing resin used for producing the lens array 680 or the like. On the other hand, the lens array production apparatus 400 included in the second optical part production system 5 uses, for example, one light irradiation unit 416 so as to be capable of radiating the light from above (opposite the base 404) to the whole light curing resin used for producing the lens array or the like.

In the lens array production apparatus 400 included in the second optical part production system 5 according to the above-mentioned configuration, the second stamper 626 made of Ni, for example, is mounted on the rotating platform 410 so that the reversely shaped plane 628 faces upward. The resin supply apparatus 402 supplies the light curing resin to the second stamper 626. The driving source 408 transmits a driving force to the rotating platform 410 that then rotates to spread the light curing resin over the surface of the first stamper 626. The moving apparatus 414 transports the optically transparent stamper 640 made of an optically transparent material so as to be stacked on the spread light curing resin. The light curing resin is transformed to the reversely shaped plane 628 of the second stamper 626 and the reversely shaped plane 642 of the second stamper 640. The light irradiation unit 416 radiates light to the transformed light curing resin. The transformed light curing resin hardens to produce the lens array 680.

As mentioned above, the second stamper 626 mounted on the support base 406 is made of a lightproof material such as Ni. Instead, it may be preferable to use the optically transparent stamper 640 made of an optically transparent material. On the other hand, the stamper placed from above the light curing resin needs to be optically transparent. That stamper cannot be replaced by lightproof stampers such as the second stamper 626 made of Ni.

Figure 26:
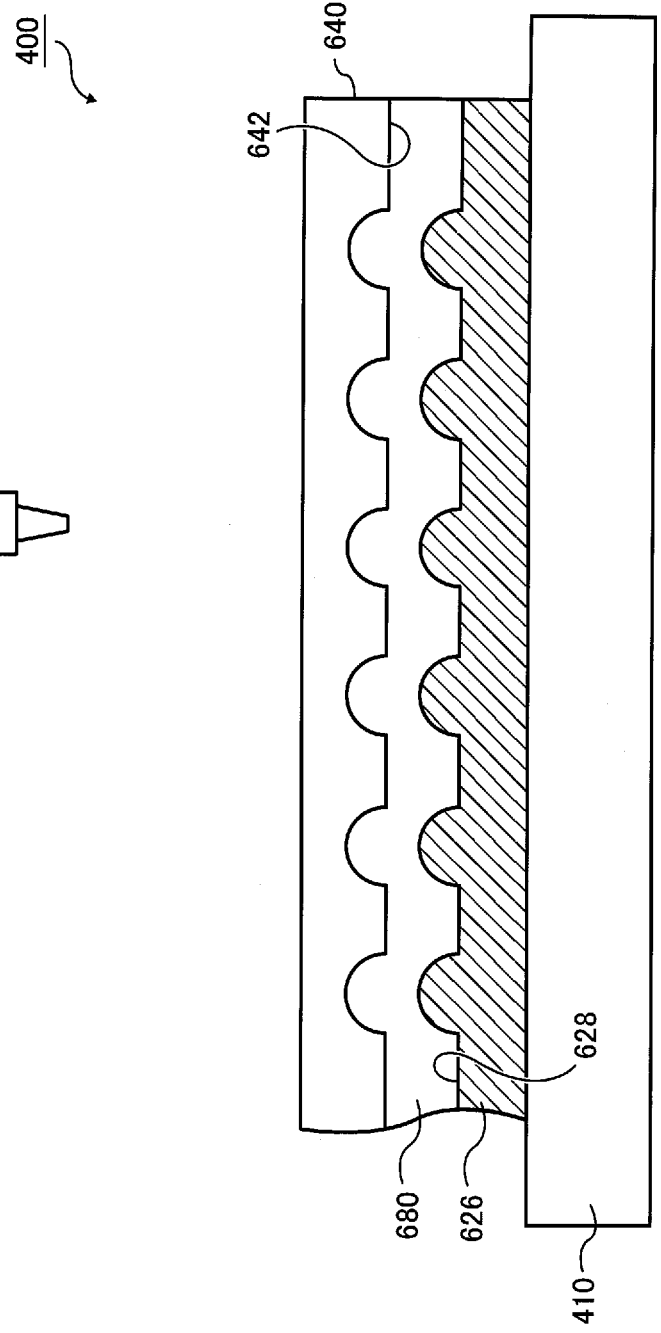
FIG. 26 illustrates a process for hardening a light curing resin using the lens array production apparatus shown in FIG. 25.

FIG. 26 shows the process of hardening the light curing resin radiated by light from the light irradiation unit 416 and producing the lens array 680.

When the light irradiation unit 416 radiates light as shown in FIG. 26, the light passes through the optically transparent stamper 640 and reaches the whole of the light curing resin, and hardens the light curing resin without leaving unhardened portions.

Figure 27:
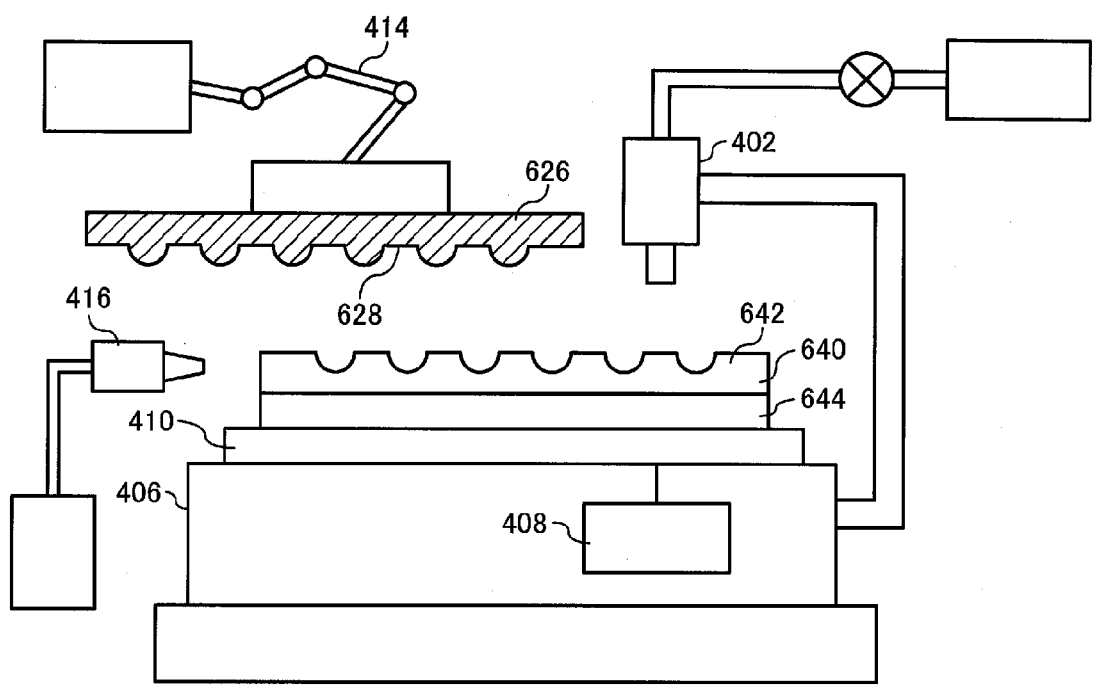
FIG. 27 shows a first modification example of the lens array production apparatus included in the optical part production system shown in FIG. 22.

FIG. 27 shows the first modification example of the lens array production apparatus 400 included in the second optical part production system 5.

In the lens array production apparatus 400 of the second optical part production system 5 mentioned above, for example, one light irradiation unit 416 is provided above the light curing resin (opposite the base 404). On the other hand, the lens array production apparatus 400 according to the first modification example includes multiple light irradiation units 416 such as four at an interval of 90 degrees or eight at an interval of 45 degrees around the rotating platform 410. The light irradiation units 416 are placed so as to sideways radiate the light to the light curing resin used for producing the lens array 680 or the like. The lens array production apparatus 400 according to the first modification example uses the rotating platform 410 whose upward surface is mirror-finished so as to be capable of reflecting the light.

The lens array production apparatus 400 according to the first modification example is used to produce the lens array 680 or the like as follows. The substrate 644 is placed on the surface of the rotating platform 410. For example, the substrate 644 includes a glass substrate made of an optically transparent material. The stamper 640 is placed on the substrate 644. The stamper 640 is produced by using an optically transparent material and is capable of transmitting the light. The light curing resin is supplied to the upward surface of the stamper 640. The second stamper 626 is pressed against the supplied light curing resin from above. The second stamper 626 is made of Ni, for example, so as to be lightproof and preferably capable of reflecting the light.

Figure 28:
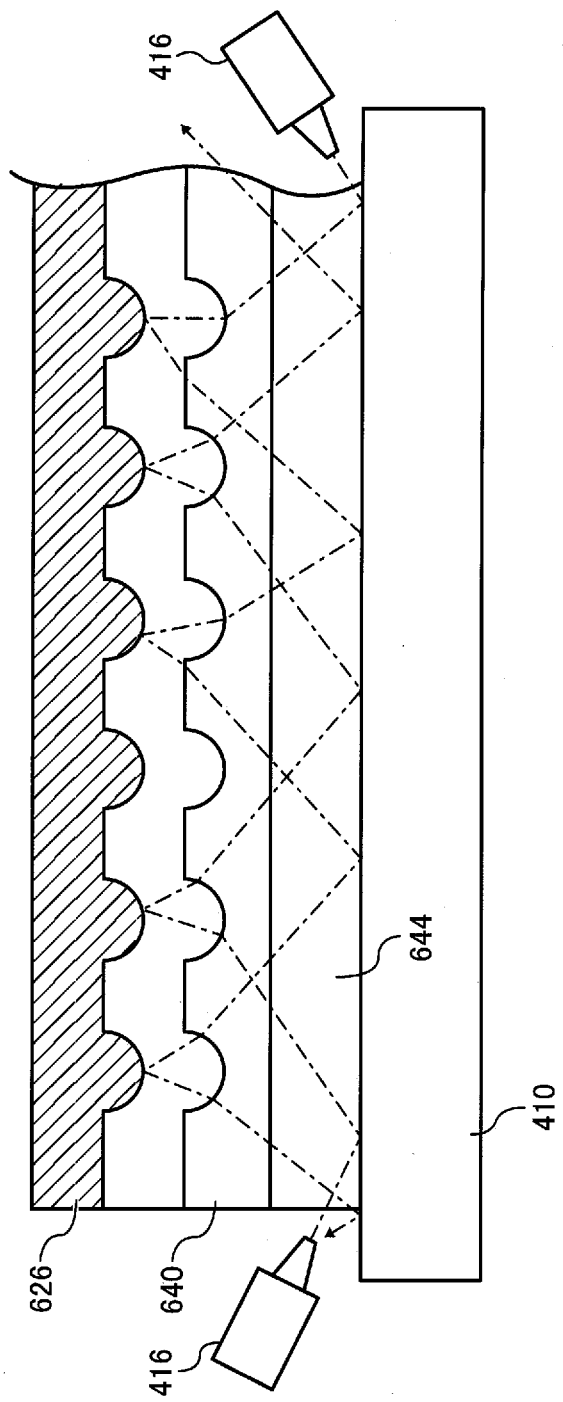
FIG. 28 illustrates a process for hardening a light curing resin using a first modification example of the lens array production apparatus shown in FIG. 27.

FIG. 28 shows the process of hardening the light curing resin radiated by light from the light irradiation unit 416 and producing the lens array 680 in the lens array production apparatus 400 according to the first modification example.

The first modification example uses eight light irradiation units 416 of which two are shown in FIG. 28. As shown in FIG. 28, the light irradiation units 416 radiate light between the second stamper 626 and the substrate 644. The light diffuses through the light curing resin so as to reflect between the second stamper 626 and the mirror-finished rotating platform 410. As a result, the light curing resin hardens. The light reflects on the rotating platform 410, passes through the stamper 640, and reaches the light curing resin.

Figure 29:
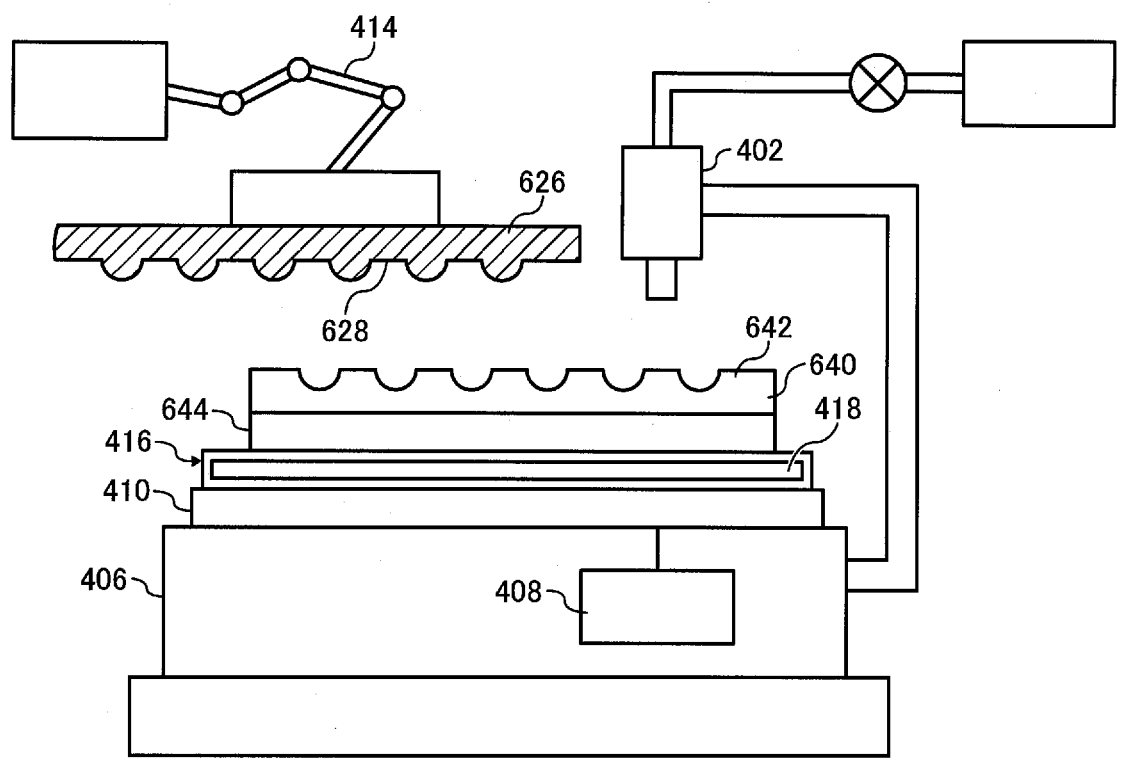
FIG. 29 shows a second modification example of the lens array production apparatus included in the optical part production system shown in FIG. 22.

FIG. 29 shows the second modification example of the lens array production apparatus 400 included in the second optical part production system 5.

The lens array production apparatus 400 included in the second optical part production system 5 mentioned above allows the light irradiation unit 416 to radiate light from above the light curing resin. The lens array production apparatus 400 according to the first modification example mentioned above radiates light from sides of the light curing resin. On the other hand, the lens array production apparatus 400 according to the second modification example radiates light from below the light curing resin. The light irradiation unit 416 used for the second modification example is mounted on the upward surface of the rotating platform 410. The light irradiation unit 416 is provided with a radiation emitter 418. The radiation emitter 418 is shaped into a circular plate whose diameter is greater than that of a stamper such as the stamper 640 mounted on the rotating platform 410. The radiation emitter 418 contains a radiation area at least larger than an area for spreading the light curing resin to be hardened. The radiation emitter 418 is supplied with power from an unshown power supply to radiate light.

The lens array production apparatus 400 according to the second modification example is used to produce the lens array 680 or the like as follows. Similarly to the first modification example mentioned above, the substrate 644 is placed on the surface of the rotating platform 410. For example, the substrate 644 includes a glass substrate made of an optically transparent material. The stamper 640 is placed on the substrate 644. The stamper 640 is produced by using an optically transparent material and is capable of transmitting the light. The light curing resin is supplied to the upward surface of the stamper 640. The second stamper 626 is pressed against the supplied light curing resin from above. The second stamper 626 is made of Ni, for example, so as to be lightproof and preferably capable of reflecting the light.

Figure 30:
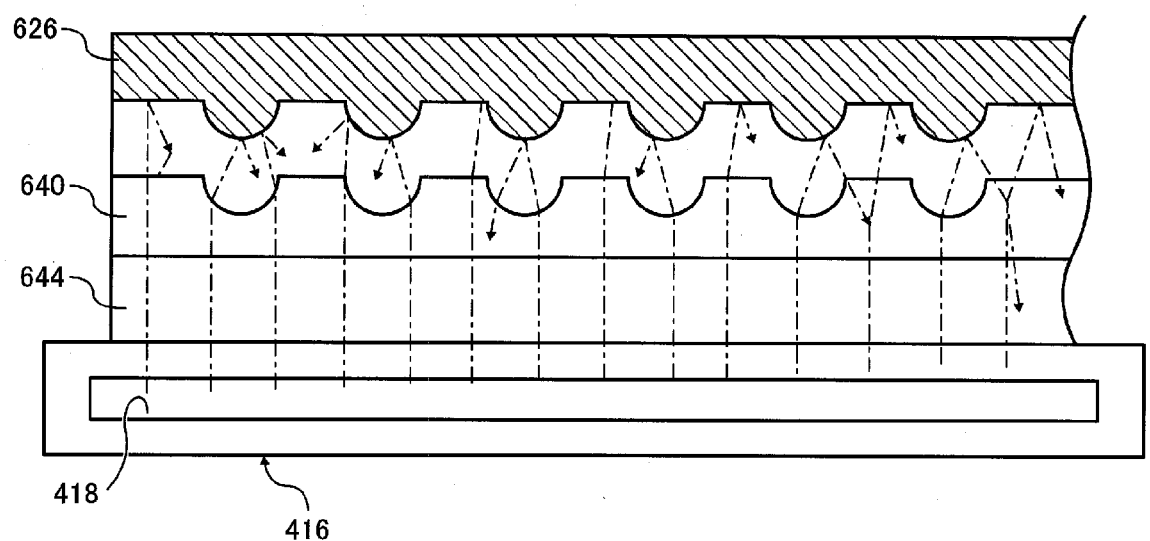
FIG. 30 illustrates a process for hardening a light curing resin using a second modification example of the lens array production apparatus shown in FIG. 29.

FIG. 30 shows the process of hardening the light curing resin radiated by light from the light irradiation unit 416 and producing the lens array 680 in the lens array production apparatus 400 according to the second modification example.

According to the second modification example, the radiation emitter 418 radiates light as shown in FIG. 30. The light radiated from the radiation emitter 418 passes through the substrate 644, then the stamper 640, and reaches the light curing resin. The light passing through the light curing resin reflects on the second stamper 626 and re-reaches the inside of the light curing resin. As a result, the light curing resin hardens.

As mentioned above, the first optical part production system 5 uses the molding apparatus 10 to produce masters such as the master 600. The second optical part production system 5 uses the molding apparatus 10 to produce the stamper 640. The molding apparatus 10 can be used to produce not only masters and stampers but also a wide range of molded articles. For example, the molding apparatus 10 can be used to mold lens arrays as optical parts.

In the first optical part production system 5, the transfer step transfers the transfer shape of the transfer member 62 to a master material. The transfer step is repeated more than once so that the transfer member 62 successively contacts different positions on the master material. In the second optical part production system 5, the transfer step transfers the transfer shape of the transfer member 62 to a stamper material. The transfer step is repeated more than once so that the transfer member 62 successively contacts different positions on the master material. Likewise, the molding apparatus 10 is used to produce the lens array as follows. The transfer step transfers the transfer shape of the transfer member 62 to a lens array material such as light curing resin or heat curing resin. The transfer step is repeated more than once so that the transfer member 62 successively contacts different positions on the lens array material.

That is, the molding apparatus 10 produces the lens array by repeating the transfer step more than once. The transfer step includes the steps of: contacting the transfer member 62 formed into the transfer shape with the lens array material used as an article to be molded and transforming the lens array material to the transfer member shape; hardening at least the transformed portion of the lens array material; separating the transfer member 62 from the lens array material; and moving the transfer member 62 to another position on the lens array material.

Figure 31:
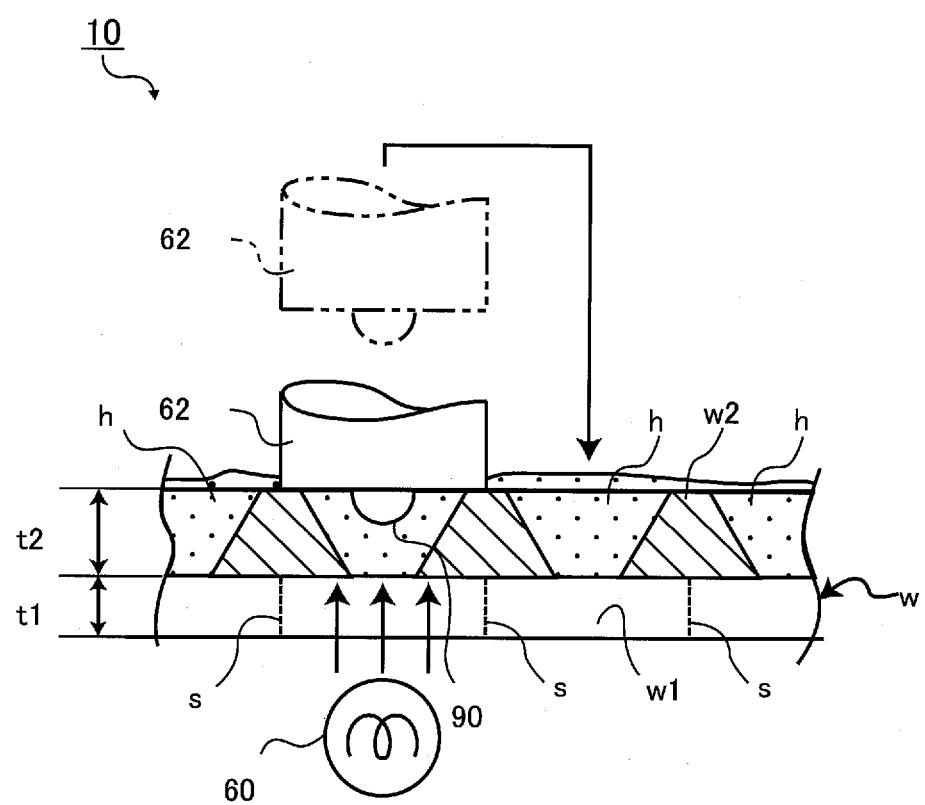
FIG. 31 shows an enlarged view around the transfer member of the molding apparatus that is producing a lens array.

FIG. 31 shows an enlarged view around the transfer member 62 of the molding apparatus 10 during production of the lens array.

When the lens array is produced as shown in FIG. 31, it may be preferable to form a scribe layer (cutting portion) S inside the substrate W1 between adjacent holes h in the substrate W1, for example. The position of the substrate W1 for forming the scribe layer S indicates a lower strength than the other portions. The substrate W1 is divided at the scribe layer S.

Figure 32A:
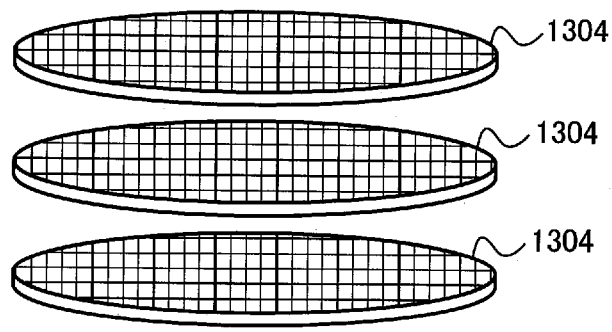
FIGS. 32A to 32C show a process of producing a lens using the lens array produced by the molding apparatus.
Figure 32B:
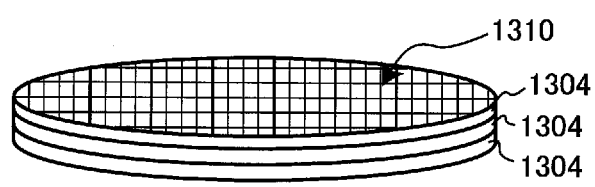
Figure 32C:
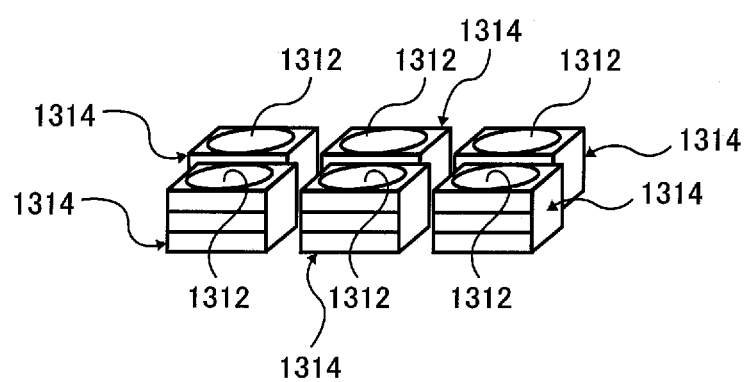

FIGS. 32A to 32C show the process of producing lenses as optical parts having at least one lens portion by using a lens array 1304 produced by the molding apparatus 10 through the above-mentioned steps.

As shown in FIGS. 32A and 32B, multiple lens arrays, after being formed, are cemented as needed such as by bonding, for example (cementing step). FIG. 32A shows three lens arrays 1304 before cementing. FIG. 32B shows a cemented lens array 1310 of the three cemented lens arrays 1304.

The cemented lens array 1310 cemented at the cementing step is divided such as by cutting so as to ensure at least one lens portion (dividing step). The cemented lens array 1310 is divided to produce lenses. As mentioned above, forming the scribe layer S (see FIG. 31) in the wafer W facilitates division of the cemented lens array 1310.

FIG. 32C shows a lens 1314 produced by cutting the cemented lens array 1310 so as to include one lens portion 1312. The cemented lens array 1310 includes the lens arrays 1304 that are cemented so as to be layered. For example, the lens 1314 may be attached to a light receiving element such as a CMOS sensor, making it possible to produce a camera. The produced camera may be built in a mobile telephone, for example.

In the above-mentioned lens manufacturing process, multiple lens arrays 1304 are cemented to form a cemented lens array. The cemented lens array 1310 is divided to produce the lenses 1314 having multiple lens portions. The lens arrays 1304 may be independently divided without being cemented to form single-layer lenses 1314. The lens array 1304 and the cemented lens array 1310 may be used as they are without being divided.

The molding apparatus 10 can be used to produce not only masters, stampers, and optical parts such as lens arrays but also electroformed molds and electroforming baths used for electroforming.

INDUSTRIAL APPLICABILITY

As mentioned above, for example, the present invention can be applied to lenses such as a lens array having an aspherical lens portion, methods of molding molded articles such as molds used for the lenses, and molding apparatuses. Further, the invention can be applied to methods of producing lenses that are used for cameras including light receiving elements such as CMOS sensors and are provided with aspherical lens portions. Moreover, the invention can be applied to methods of producing associated stampers, master production apparatuses, stamper production systems, and stamper production apparatuses.

The invention claimed is:

1. A method of molding comprising:
a transformation step of making contact between an article to be molded and a transfer member and transforming the article to be molded to a transfer shape formed on the transfer member, the transfer shape being formed equally to or reversely to an aspherical lens portion; a hardening step of hardening at least a transformed portion of the article to be molded; a separation step of separating the article to be molded and the transfer member from each other; and a moving step of moving the transfer member to another position of the article to be molded,
wherein a transfer step of transferring the transfer shape to the article to be molded is repeated more than once, and wherein there is an initial pitch distance between positions for the transfer member to contact the article to be molded and a subsequent pitch distance changed in accordance with shrinkage of the article to be molded, the subsequent pitch distance being a distance between one position for transferring the transfer shape to the article to be molded and another position for transferring the transfer shape, to the article to be molded that is adjacent to said one position.

2. The method of molding according to claim 1, wherein the transformation step includes:
an injection step of injecting the article to be molded into a plurality of holes formed in a substrate; and
a contact step of contacting the transfer member with the article to be molded injected into the hole.

3. The method of molding according to claim 2, wherein the injection step and the contact step are alternately repeated more than once.

4. The method of molding according to claim 1, wherein the transformation step transforms the article to be molded using the transfer member that only forms one aspherical lens shape or a shape formed reversely to the aspherical lens shape.

5. The method of molding according to claim 1, wherein the article to be molded made of a light curing material is used; and
wherein the hardening step hardens the article to be molded by radiating light.

6. The method of molding according to claim 1, wherein the article to be molded made of a heat curing material is used; and
wherein the hardening step hardens the article to be molded by heating.

7. The method of molding according to claim 1, wherein an aspherical lens is molded.

8. The method of molding according to claim 1, wherein a mold used for forming an aspherical lens is molded.

9. A process for producing a lens comprising:
a molding step of molding a mold having a plurality of shapes formed reversely to the transfer shape by repeating a transfer step more than once, wherein the transfer step includes: a transformation step of making contact between an article to be molded and a transfer member having a transfer shape formed equally to an aspherical lens portion and transforming the article to be molded to the transfer shape; a hardening step of hardening at least a transformed portion of the article to be molded; a separation step of separating the article to be molded and the transfer member from each other; and a moving step of moving the transfer member to another position of the article to be molded, wherein a pitch distance between positions for the transfer member to contact the article to be molded is changed in accordance with shrinkage of the article to be molded, the pitch distance being a distance between one position for transferring the transfer shape to the article to be molded and another position for transferring the transfer shape to the article to be molded that is adjacent to said one position;

a lens array formation step of forming a lens array having a plurality of aspherical lens portions using said mold molded by the molding step; and a dividing step of dividing the lens array formed by the lens array formation step into a plurality of lenses having at least one aspherical lens portion.

* * * * *